US008452313B2

(12) United States Patent  (10) Patent No.: US 8,452,313 B2
Shah et al.  (45) Date of Patent: *May 28, 2013

(54) ACCESSING TEXTSITES USING TEXT MESSAGING SERVICE

(75) Inventors: Manish R. Shah, Mountain View, CA (US); Clinton Nielsen, Saint Albert (CA)

(73) Assignee: Intuit Inc., Mountain View, CA (US)

( * ) Notice: Subject to any disclaimer, the term of this patent is extended or adjusted under 35 U.S.C. 154(b) by 315 days.

This patent is subject to a terminal disclaimer.

(21) Appl. No.: 12/728,169

(22) Filed: Mar. 19, 2010

(65) Prior Publication Data

US 2011/0230214 A1  Sep. 22, 2011

(51) Int. Cl.
*H04W 4/00* (2009.01)
(52) U.S. Cl.
USPC ............... 455/466; 455/414.1; 455/414.2; 455/414.3; 455/414.4
(58) Field of Classification Search
USPC ............................................. 455/466
See application file for complete search history.

(56) References Cited

U.S. PATENT DOCUMENTS

| 6,321,257 | B1 | 11/2001 | Kotola et al. | |
|---|---|---|---|---|
| 2002/0107735 | A1* | 8/2002 | Henkin et al. | 705/14 |
| 2003/0050931 | A1 | 3/2003 | Harman et al. | |
| 2003/0172357 | A1* | 9/2003 | Kao et al. | 715/529 |
| 2006/0080292 | A1* | 4/2006 | Alanzi | 707/3 |
| 2006/0242234 | A1* | 10/2006 | Counts et al. | 709/204 |
| 2007/0027839 | A1 | 2/2007 | Ives | |
| 2007/0293247 | A1* | 12/2007 | Bhat et al. | 455/466 |
| 2007/0294096 | A1* | 12/2007 | Randall et al. | 705/1 |
| 2008/0104061 | A1* | 5/2008 | Rezaei | 707/5 |
| 2010/0223356 | A1* | 9/2010 | Scott | 709/218 |
| 2010/0228622 | A1* | 9/2010 | Vijayakrishnan | 705/14.44 |
| 2010/0262428 | A1* | 10/2010 | Goldsmith | 705/1.1 |
| 2011/0106617 | A1* | 5/2011 | Cooper et al. | 705/14.49 |

OTHER PUBLICATIONS

PCT International Search Report and Written Opinion issued for Application No. PCT/US2010/042304, dated Mar. 29, 2011, 9 pages.
4INFO SMS Mobile Media, "Publishing and Mobile Marketing", http://advertising.4info.com/publishers, Dec. 4, 2009, 2 pages.

* cited by examiner

*Primary Examiner* — Lester Kincaid
*Assistant Examiner* — Mehmood B Khan
(74) *Attorney, Agent, or Firm* — Osha Liang LLP

(57) ABSTRACT

A method for providing access to content using a global textsite platform (GTP) including receiving a user message identifying a registered unique keyword maintained by the GTP, wherein the registered unique keyword is registered with the GTP by a publisher for accessing a textsite comprising a plurality of text pages published by the publisher and indexed based on a plurality of navigating keywords defined by the publisher, retrieving authored content associated with the textsite based on the registered unique keyword, accessing the textsite based on the authored content to retrieve a navigating keyword indexing a text page, and sending a GTP message comprising the navigating keyword for the user to access the text page, wherein the user message and the GTP message comprise a text message transmitted using a text messaging service (TMS).

35 Claims, 13 Drawing Sheets

ACCESSING TEXTSITES USING TEXT MESSAGING SERVICE

CROSS REFERENCE TO RELATED APPLICATIONS

This application is related to copending U.S. patent application Ser. No. 12/728,165, filed on Mar. 19, 2010, and entitled "METHOD AND SYSTEM FOR MAINTAINING TEXTSITES ON A GLOBAL TEXTSITE PLATFORM," which is also assigned to the assignee of the present application, the subject matter of which is incorporated by reference herein.

BACKGROUND

Today's mobile devices, such as smart phones, allow users to browse the Internet from any location to obtain information on demand. As long as a user is in an area with the proper telecommunication network and subscribes to a data plan, the user is provided with access to the Internet for web browsing to obtain information such as phone numbers for service provides, map out a particular destination location, and obtain information relevant to the user's current or next activity. However, there are often instances in which a user wishes to access only limited information for a quick answer to a question (e.g., what are the next available show times for a particular movie?). In this scenario, browsing the website for the movie theater or a service provider website that provides movie show times, such as Fandango, may be cumbersome on the mobile device. Specifically, loading all the graphics and advertisements associated with websites on a mobile device can take additional time. Alternatively, the entire website may provide too much data to navigate through when a user desires only a specific piece of information. In addition, for mobile device users who do not subscribe to a data plan for browsing the Internet, are in an area without the proper telecommunication network, or do not have browsing capability on their mobile device, accessing such information on demand is not possible.

One solution to the aforementioned problem is for content publishers to provide information to users on mobile devices via text messaging, in particular those transmitted using Short Messaging Service (SMS). Due to the growth and penetration of SMS capable mobile devices, the content publishers and service providers have attempted to enable access to its content and products via SMS. To facilitate providing content via SMS, each content publisher and/or service provider is required to secure its own SMS codes per country or per geographic region. For example, Google™ has reserved code 466453 for the United States and code 9773300000 for India. Similarly, Facebook® has reserved code 32665 for the United States and code 9232232665 for India (Facebook® is a registered trademark of Facebook Inc., located in Palo Alto, Calif.). Once a local mobile code is provisioned by a local operator of that particular geographic region, a custom adapter is required to be developed to integrate with local operator APIs for sending and receiving SMS. Accordingly, the publisher must create such an adapter. The need for such an adapter often makes offering a company's content via SMS from multiple countries to mobile device users a barrier for a typical web content publisher or web-based service provider.

SUMMARY

In general, in one aspect, the invention relates to a method for providing access to content using a global textsite platform (GTP). The method includes receiving, from a device of the user, a first user message identifying a registered unique keyword maintained by the GTP, wherein the registered unique keyword is registered with the GTP by a publisher for accessing a textsite comprising a plurality of text pages published by the publisher and indexed based on a plurality of navigating keywords defined by the publisher, retrieving authored content associated with the textsite based on the registered unique keyword, accessing the textsite based on the authored content to retrieve a navigating keyword of the plurality of navigating keywords, the navigating keyword indexing a text page within the plurality of text pages, and sending, to the device and in response to receiving the first user message, a first GTP message comprising the navigating keyword for the user to access the text page, wherein the first user message and the first GTP message comprise a first text message transmitted using a text messaging service (TMS).

In general, in one aspect, the invention relates to a method for accessing content from a global textsite platform (GTP) by a user using a user mobile device. The method includes obtaining a registered unique keyword associated with a textsite, sending, using the user mobile device, a user message identifying the registered unique keyword to the GTP, and receiving a GTP message, in response from the GTP, comprising a home text page of the textsite, wherein one or more of the user message and the GTP message comprise a text message transmitted using a text messaging service (TMS).

In general, in one aspect, the invention relates to a system for providing content using a global textsite platform (GTP). The system includes a repository storing a registry comprising a plurality of registered unique keywords, wherein a registered unique keyword, and metadata associated therewith, of the plurality of registered unique keywords are stored in a entry of the registry, the metadata containing access information to a textsite of a plurality of textsites indexed based on the plurality of registered unique keywords, and wherein the registered unique keyword is registered with the GTP by a publisher of the textsite comprising a plurality of text pages published by the publisher and indexed based on a plurality of navigating keywords defined by the publisher for navigating the textsite, a processor and memory storing instructions when executed by the processor comprising functionalities to receive, from a device of a user, a first user message identifying the registered unique keyword, retrieve the metadata from the registry based on the registered unique keyword, access the textsite based on the metadata to retrieve a navigating keyword of the plurality of navigating keywords, the navigating keyword indexing a text page within the plurality of text pages, and send, to the device and in response to receiving the first user message, a first GTP message comprising the navigating keyword for the user to access the text page, wherein one or more of the first user message and the first GTP message comprise a first text message transmitted using a text messaging service (TMS).

In general, in one aspect, the invention relates to a computer readable storage medium storing software instructions for providing access to content using a global textsite platform. The software instruction, when executed, comprise functionality to receive, from a device of the user, a first user message identifying a registered unique keyword maintained by the GTP, wherein the registered unique keyword is registered with the GTP by a publisher for accessing a textsite comprising a plurality of text pages published by the publisher and indexed based on a plurality of navigating keywords defined by the publisher, retrieve authored content associated with the textsite based on the registered unique keyword, access the textsite based on the authored content to retrieve a navigating keyword of the plurality of navigating keywords, the navigating keyword indexing a text page within the plurality of text pages, and send, to the device and in response to receiving the first user message, a first GTP message comprising the navigating keyword for the user to access the text page, wherein the first user message and the first GTP message comprise a first text message transmitted using a text messaging service (TMS).

Other aspects of the invention will be apparent from the following description and the appended claims.

DETAILED DESCRIPTION

Figure 1:
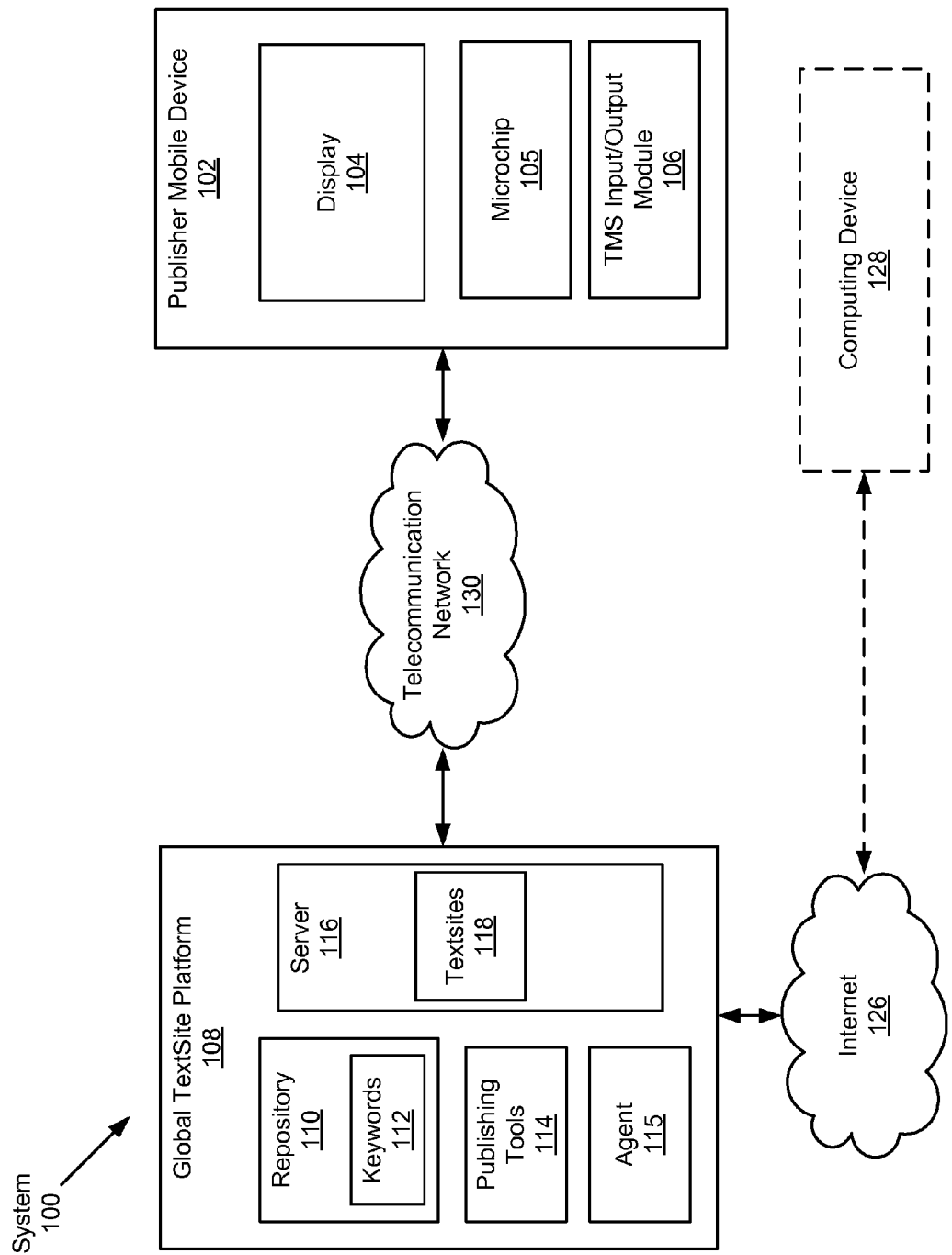
FIG. 1 shows a flow diagram of a system from the perspective of a publisher in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for providing access to content via a text messaging service (TMS). As is known to those skilled in the art, although certain TMS protocols have been used to transmit multi-media content (e.g., picture, video, etc.), all TMS protocols support transmission of the text messaging content. In one or more embodiments, access to publish content and access to browse the published content is provided by a global textsite platform that is globally accessible in a variety of geographic locations. Embodiments of the invention also provide a method and system for a global textsite platform that may be used by existing web publishers and new publishers to easily publish content that is accessible by any mobile user of text messaging services throughout the world.

FIG. 1 shows a flow diagram of a system (100) for publishing content by a publisher in accordance with one or more embodiments of the invention. Specifically, FIG. 1 shows a publisher mobile device (102), a telecommunication network (130), and a global textsite platform (108). Each of the aforementioned components of the publisher system is described below.

Generally, a publisher may be any person or entity that wishes for users to have access to information/content via a text messaging service. More specifically, a publisher may be any developer or service provider that provides a service or a product for users. For example, a publisher may be a restaurant owner that creates a textsite to provide information about his/her restaurant. A publisher may possess, in one or more embodiments of the invention, a publisher mobile device (102). In one or more embodiments of the invention, the publisher may optionally possess a computing device (128), such as a desktop computer, a laptop computer, a thin computer, a mobile device associated with a data plan subscription (e.g., a smart phone, a tablet, a pad device, a gaming device a personal digital assistant, etc.), a combination thereof, or any other suitable electronic computing device that is capable of connecting to the global textsite platform (108) via the Internet (126). The computing device (128) may provide greater functionality to interact with the global textsite platform (108) than the publisher mobile device (102). Accordingly, the interaction with the global textsite platform (108) may be accomplished using a network (such as the Internet (126)), rather than a telecommunication network (130). In one or more embodiments of the invention, the computing device (128) includes functionality such as the computing device (1100) shown in FIG. 11 and described below.

The publisher mobile device (102) may be any mobile device, such as a Code Division Multiple Access (CDMA) device, a global system mobile (GSM) device, a 3G device, a 4G device, or any other suitable mobile device that includes text messaging functionality. The publisher mobile device (102) includes a display (104), a microchip (105), and a text messaging service (TMS) input/output module (106). In one or more embodiments of the invention, the publisher mobile device (102) is operatively connected to a global textsite platform (108) via a telecommunication network (130). The telecommunication network (130) may be any network that facilitates the exchange of messages from one part of the network to another. For example, the telecommunication network (130) may be a wide area network, a local area network, a public switched telephone network (PSTN), or any other suitable network for exchanging messages between the global textsite platform (108) and the publisher mobile device (102).

The display (104) of the publisher mobile device (102) may be a display screen using technology such as liquid crystal display (LCD), a light emitting diode (LED), organic light emitting diode (OLED), or any other suitable type of display screen capable of displaying the content of received text messages and the content of a text message that is being composed on the publisher mobile device (104). The microchip (105) may be any tangible hardware processor(s) or microprocessor(s) for executing the functionalities of the publisher mobile device (102). More specifically, the microchip (105) executes the software application(s) that provide functionalities such as browsing, text messaging, maintaining a contact list and making phone calls, etc. The TMS input/output module (106) may be a virtual keyboard, a physical keyboard, or any other input/output device(s) or button(s) that allows the publisher to compose text messages and receive and read text message responses.

Continuing with FIG. 1, the global textsite platform (108) is a framework for providing publishers with publishing tools for authoring content that is accessible via a text messaging service (TMS). The TMS may be, for example, Short Messaging Service (SMS), Multi-media Messaging Service (MMS), Enhanced Messaging Service (EMS), or any other text messaging service which is now known or later developed. In one or more embodiments of the invention, a textsite is one or more pages of content that is made globally accessible via a TMS. Similar to websites known today, which are made globally accessible via the Internet, a textsite includes a homepage and one or more text pages that are hierarchically and/or organizationally linked to the homepage for browsing information contained on one or more text pages of the textsite.

In one or more embodiments of the invention, the global textsite platform (108) executes on one or more computing device(s) (e.g., a server, a computer system as shown in FIG. 11 and described below, etc.) and may be hosted by an entity, such as a corporation. In one or more embodiments of the invention, the global textsite platform (108) is associated with a platform syntax that is specific to the global textsite platform (108) and that facilitates communication via a TMS. In one or more embodiments of the invention, the global textsite platform (108) may be associated with different unique phone numbers or codes corresponding to each different geographic locations. Alternatively, a single, unique global number/code may be associated with the global textsite platform (108).

In one or more embodiments of the invention, the global textsite platform (108) includes numerous components including a repository (110), a server (118), publishing tools (114), and an agent (115). Each component is described below in related to FIG. 1 except for the agent (115), which is described with respect to FIG. 2.

The repository (110) is configured with functionality to store keywords (112). The repository may be any datastore (flat file, hierarchical file, relational database, enterprise-wide database, etc.) capable of storing data, regardless where or in what form the data originates. Keywords (112) may be reserved or pre-designated keywords maintained by the platform as part of the platform syntax, and publisher keywords that are registered by publishers for each textsite authored by a publisher. In one or more embodiments of the invention, pre-designated keywords and publisher registered keywords are unique. That is, no two keywords from the group of keywords that are pre-designated as platform syntax or the group of keywords provided by a publisher, are allowed to be identical. In fact, in one or more embodiments of the invention, the keywords (114) are closely controlled by the global textsite platform in an effort to eliminate duplicates. Navigating keywords, which a publisher defines for a textsite that is associated with a unique registered keyword, are also used. Navigating keywords are not required to be unique. For example, two distinct publishers with distinct registered keywords representing a first and a second textsite may use the same navigating keyword for different text pages associated with the first and second textsites.

In one or more embodiments of the invention, the global textsite platform (108) is configured with functionality to receive a unique keyword from a publisher and create a textsite (118) on behalf of the publisher. Further, the global textsite platform (108) is configured with functionality to receive content authored by the publisher using the publishing tools (114) provided by the global textsite platform (108). In one or more embodiments of the invention, publishing tools (114) may include any software or hardware tool that aids a publisher in authoring content for a textsite to the global textsite platform (108). Publishing tools (114) may be maintained by the global textsite platform (108). For example, in one or more embodiments of the invention, publishing tools (114) may include, but are not limited to, a registration service that registers unique keywords for each textsite, a text messaging protocol for sending and receiving text messages via a TMS, a page status tool for displaying the number of visits a particular publisher textsite has received, a tool for printing a flyer to advertise a registered keyword associated with a created textsite, a tool for integrating content from third-party websites with a created textsite, or any other suitable tool for authoring content for a textsite. The text messaging protocol, for example, may be a protocol that specifies syntax and semantics for exchanging messages via a TMS with the global textsite platform (108).

The global textsite platform (108) also includes a server (116) configured to host the plurality of textsites (118) created and maintained by the global textsite platform (108) on behalf of publishers. Those skilled in the art will appreciate that the server (116) may be any computing device with a large storage capacity for hosting the plurality of textsites (118).

More details of how a publisher registers and publishes content for a textsite may be found in copending related application with the application Ser. No. 12/728,165, the subject matter of which has been incorporated by reference above.

Figure 2:
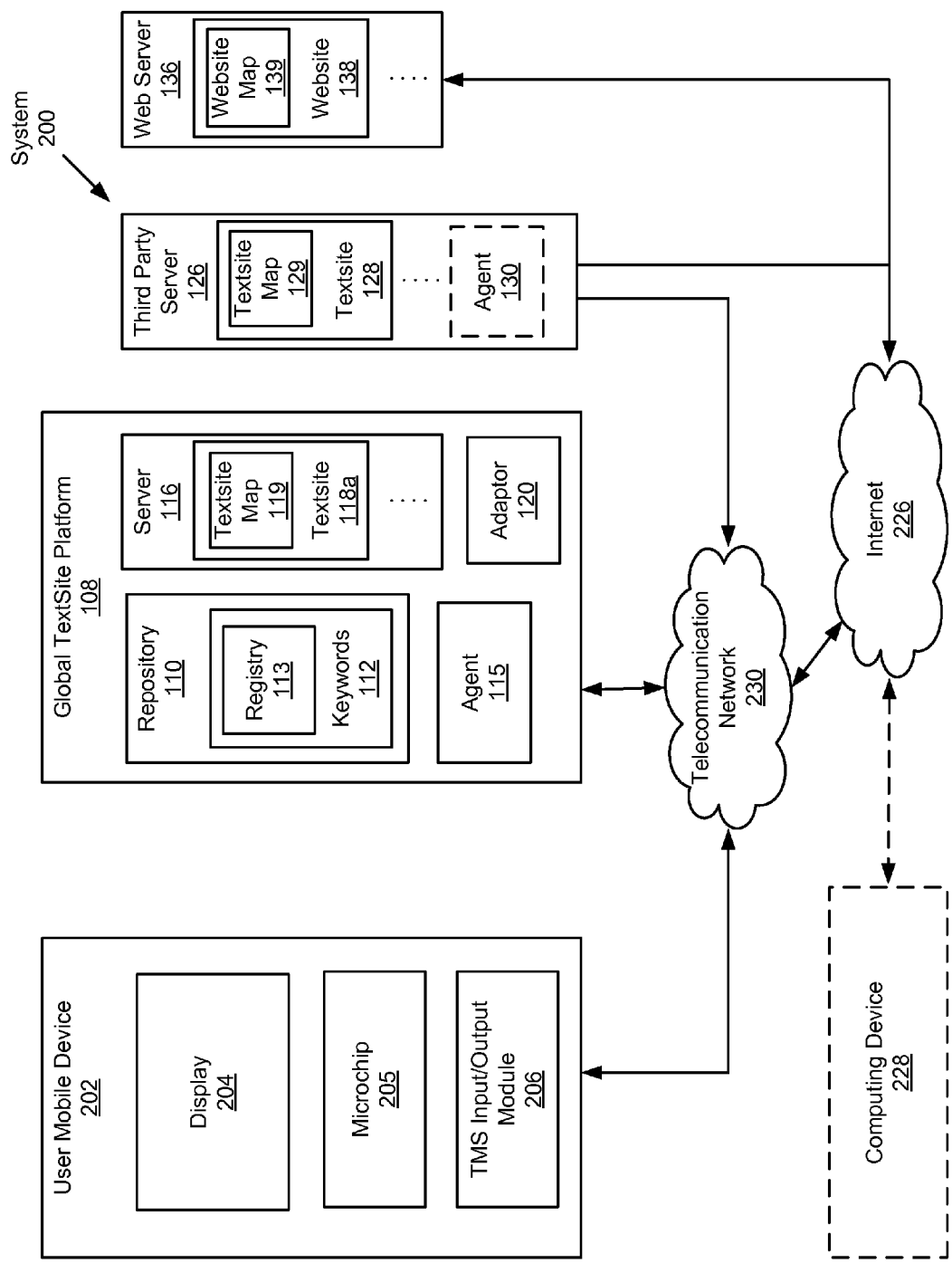
FIG. 2 shows a flow diagram of a system from the perspective of a user in accordance with one or more embodiments of the invention.

FIG. 2 shows a flow diagram of a system (200) for accessing content from a user's perspective in accordance with one or more embodiments of the invention. Specifically, FIG. 2 shows the global textsite platform (108) of FIG. 1 with additional details, a user mobile device (202), a third party server (126) hosting a textsite (128), and a web server (136) hosting a website (138) having contents converted by the global textsite platform (108) to be accessible via TMS. As shown in FIG. 2, these components are connected via the telecommunication network (230) and/or the Internet (226).

In one or more embodiments of the invention, the global textsite platform (108) includes a repository (110) for storing keywords (112), a server (116) configured to host a plurality of textsites (e.g., text site (118a)), an agent (115), and an adaptor (120). The publishing tools (114) are omitted in FIG. 2 for clarity. In one or more embodiments, a portion of the keywords (112) is organized as a registry (113) storing a number of registered unique keywords each used as a site identifier and associated with metadata describing a mechanism for accessing corresponding site content such as stored in one of textsite (118a), textsite (128), website (138), etc. In one or more embodiments, the registered unique keywords (i.e., used as site identifiers) are registered as described with respect to FIG. 1 above with relevant information processed into the associated metadata.

In one or more embodiments, the textsite (118a) may be hosted by the global textsite platform (108) on behalf of a first publisher or may be an in-house textsite maintained by the global textsite platform (108). In such embodiments, the metadata associated with the registered unique keyword (i.e., used as site identifiers) includes an internal link to the textsite (118a) within the global textsite platform (108).

In one or more embodiments, the textsite (128) is published by a second publisher that has registered with the global textsite platform (108) but is hosted on a separate third party server (126). In such embodiments, the metadata associated with the registered unique keyword (i.e., used as site identifier) includes an access path for the global textsite platform (108) to access the third party server (126) via the telecommunication network (230) and/or the Internet (226). In one or more embodiments, the third party server (126) may include agent (130) configured with similar functionalities as those of the agent (115). For example, the agent (130) may be provided to an operator of the third party server (126) by an operator of the GTP (108) under a pre-determined business agreement (e.g., a licensing agreement).

In one or more embodiments, contents of the website (138) are converted by the global textsite platform (108) to be accessible to a user via TMS. In such embodiments, the metadata associated with the registered unique keyword includes an access path for the global textsite platform (108) to access the web server (136) via the Internet (226) and identifies whether the contents of the website (138), or a portion thereof, are converted dynamically (i.e., on demand) or statically (i.e., pre-converted and stored).

Further as shown in FIG. 2, the user mobile device (202) is operatively connected to the global textsite platform (108) and the third party server (126) via a telecommunication network (230). The user mobile device (202) includes a display (204), a microchip (205), and a TMS input/output module (206). Those skilled in the art will appreciate that the aforementioned global textsite platform (108) components and user mobile device (202) components are capable of the same functionality described above with respect to FIG. 1, one difference being that the components of the user mobile device (202) include functionality to execute software, display text messages, and take TMS input from a user and output TMS responses to the user browsing a textsite rather than a publisher.

In one or more embodiments of the invention, a user is defined as a person or entity accessing content published by publishers and registered with the global textsite platform (108). As noted above, the published and registered content may be hosted by the global textsite platform (108), hosted on the third party server (126), or converted from a website (138). In one or more embodiments of the invention, a user is a person or entity with a mobile device that does not have a data plan subscription. Rather, the user is able to obtain data using the mobile device only via a TMS. That is, embodiments of the invention pertain specifically to users accessing content only via a TMS. Those skilled in the art will appreciate, however, that although embodiments of the invention target users that communicate via a TMS, the invention is not limited to such users. Specifically, while embodiments of the invention are directed to providing access to textsites to users using a mobile phone via a TMS, some users may be provided with the capability to access content on the global textsite platform (108) via a computing device (228) that is connected to the Internet (226). For example, in one or more embodiments, a user may use a text message emulator executing on the computing device (228) to connect to the global textsite platform (108) via the Internet (226). Alternatively, users with smart phones and/or mobile devices that support Internet browsing functionality could access content on the global textsite platform (108) using the Internet (226).

In the user system (200) of FIG. 2, the global textsite platform (108) is configured to receive a text message from the user mobile device (202) that includes a request to access a textsite hosted by the global textsite platform (108). Further, the global textsite platform (108) is configured to process the request received from the user mobile device (202), and to provide the content from the desired textsite to the user's mobile device (202) via a TMS.

To facilitate this interaction with a user mobile device (202), the global textsite platform (108) includes an agent (115). In one or more embodiments of the invention, the agent (115) may be software that is the component of the global textsite platform (108), which communicates with a user mobile device (202). Specifically, the agent (115) is configured with functionality to receive a text message (i.e., a user message) from a user mobile device (202), parse the text message for the relevant keywords or platform-specific syntax, and respond to the user request by identifying and retrieving the content from the requested textsite/converted website for delivering back to the user mobile device (202) in accordance with one or more embodiments of the invention. In one or more embodiments, the content is delivered to the user mobile device (202) in a text message sent from the global textsite platform (i.e., a GTP message).

In one or more embodiments of the invention, the agent (115) is configured to identify, based on the registry (113), a registered unique keyword (i.e., used as site identifier) in the user message as a request to access the textsite (118a) hosted on the global textsite platform (108) or the textsite (128) hosted on the third party server (126). Accordingly, the agent is configured to access the textsite (118a) or the textsite (128) using the aforementioned access path included in the associated metadata. In one or more embodiments, the agent (115) is configured to exchange text messages with the user mobile device (202) for navigating a text page hierarchy of the textsite (118a) or the textsite (128). In one or more embodiments, the textsite (118a) and the textsite (128) include textsite map (119) and textsite map (129), respectively, that describe the hierarchical relationships of text pages contained within each textsite (118a, 128). For example, the textsite map (119) and the textsite map (129) may each include a data structure (e.g., graph, tree, linked list, file, database, etc.) containing navigating keywords defined by the respective publisher. Generally speaking, navigating keyword information (e.g., access information such as location, address, or other information enabling access to a text page pointed to by a navigating keyword) and navigation paths among text pages in the textsite (e.g., textsite (118a)) are stored in the textsite map (e.g., textsite map (129)). Specifically, a navigation path leads from one text page to another via intervening text pages accessed using the navigating keywords contained in each of the text pages traversed along the navigation path. More details of navigating a textsite, for example based on the textsite map, by exchanging text messages between the agent (115) and the user mobile device (202), are described in reference to FIGS. 3-5J below.

In one or more embodiments of the invention, the agent (115) is configured to identify, based on the registry (113), a registered unique keyword (i.e., used as site identifier) in the user message as a request to access the website (128) hosted on the web server (136). For example, such registered unique keyword may be registered by a publisher of an adaptor plug-in that maps the website map (139) into a global textsite platform syntax suitable for the adaptor (120) to convert contents of the website (138). Accordingly, the agent (115) is configured to activate the adaptor (120) for accessing the website (138) using the aforementioned access path included in the associated metadata. In one or more embodiments, the agent (115) is configured to exchange text messages with the user mobile device (202) and convert between such text messages in the global textsite platform syntax (e.g., navigating keywords) and the website map (139) for navigating a website document hierarchy of the website (188). For example, the mapping between such navigating keywords and the website map (139) may be contained in an adaptor plug-in for the website (138) where the navigating keywords are defined by the publisher of the adaptor plug-in. More details of accessing a website via TMS by exchanging text messages between the agent (115) and the user mobile device (202) are described in reference to FIGS. 3 and 4 below.

In one or more embodiments of the invention, the agent (115) is configured to identify a web URL (i.e., used as website identifier in Universal Resource Locator format) in the user message as a request to access the website (128) hosted on the web server (136). Accordingly, the agent (115)

is configured to activate the adaptor (120) for accessing the website (138) using the identified web URL via the Internet (226). The subsequent navigation of the website (139) may be essentially the same as described above.

In one or more embodiments of the invention, the textsite (118*a*), the textsite (128), and/or the website (138) are configured to integrate contents from each other. In such embodiments, the textsite map (119), the textsite map (129), and/or the website map (139) are configured to include registered unique keywords (i.e., used as site identifiers) of other textsites and/or websites, which may be included in user text messages for redirecting the user mobile device (202) from one site (e.g., one of the textsite (118*a*), the textsite (128), and the website (138)) to another during navigation of textsite content or converted website content.

In one or more embodiments of the invention, the aforementioned text messages exchanged between the user mobile device (202) and the global textsite platform (108), and more specifically between the user mobile device (202) and the agent (115), are of the same TMS protocol. Alternatively, text messages exchanged may include more than one TMS protocol. For example, the user messages may be SMS and the GTP messages may be MMS. Additional combinations are also possible in other examples.

Although the description above uses the user mobile device (202) in various example embodiments, those skilled in the art will appreciate that similar functionalities may be achieved by substituting the user mobile device (202) with the computing device (228). Further, the aforementioned redirecting functionality may be adapted to allow browsing of website (139) using the computing device (228) to be redirected to accessing a textsite (e.g., textsite (118*a*) or textsite (128)) using the user mobile device (202) and vice-versa.

Although the GTP data (e.g., keywords, registry, textsite map, etc.) shown in FIG. 2 above are described in specific formats and organizations, those skilled in the art with the benefit of this disclosure will recognize that GTP data may be in other formats or organizations without deviating from the spirit of the invention.

Figure 3:
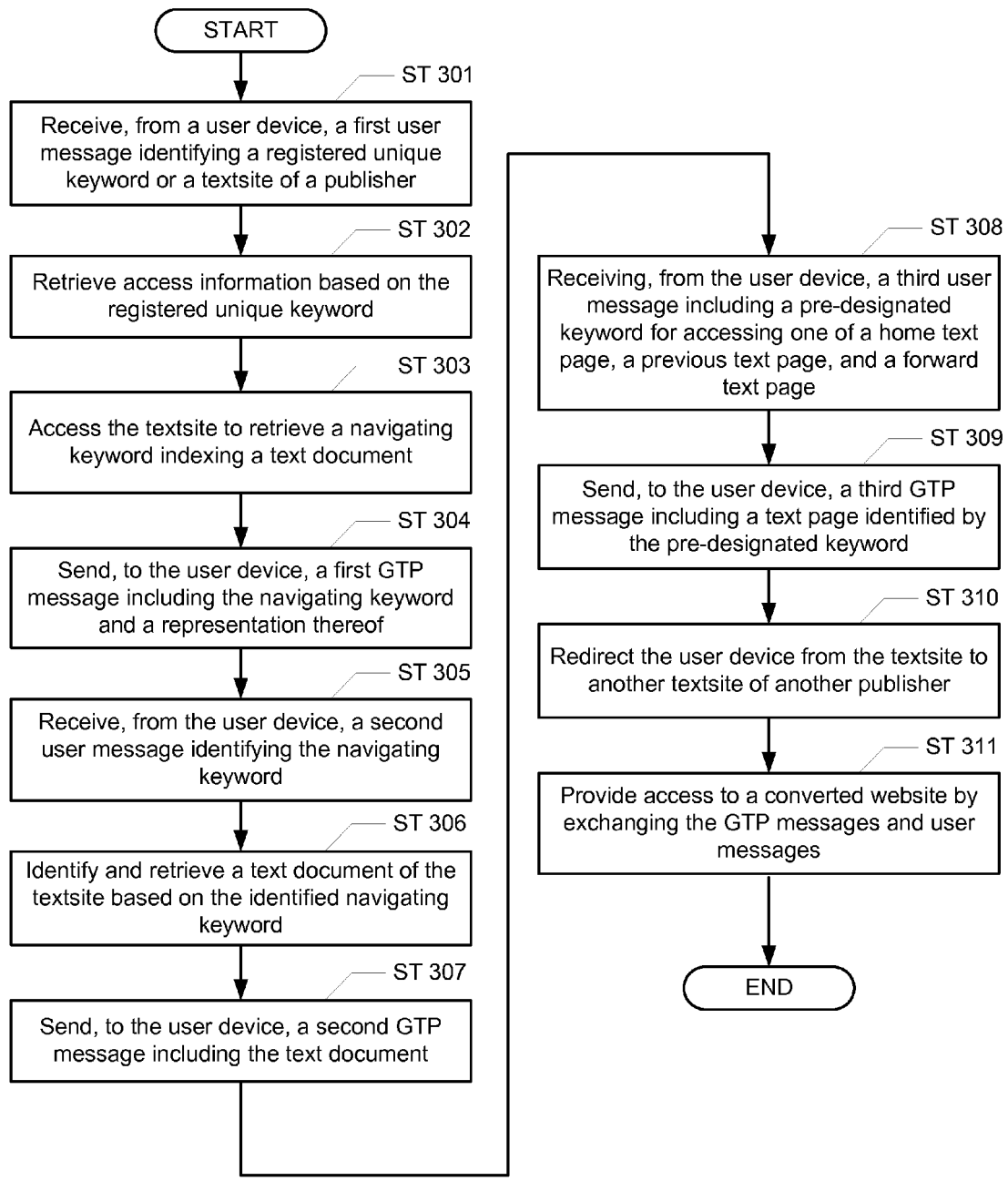
FIG. 3 shows a flow chart for providing access to content by a global textsite platform in accordance with one or more embodiments of the invention.

FIG. 3 shows a flow chart for accessing content of one or more textsites in accordance with one or more embodiments of the invention. More specifically, FIG. 3 shows a flow chart describing the process for accessing content from the global textsite platform (GTP) perspective, in which the platform provides users (i.e., users accessing content authored by publishers) with access to content maintained in the form of textsites by the GTP. In one or more embodiments of the invention, the method of FIG. 3 may be practiced using the GTP described in reference to FIGS. 1 and 2 above. In one or more embodiments of the invention, one or more of the steps shown in FIG. 3 may be omitted, repeated, and/or performed in a different order than that shown in FIG. 3. Accordingly, the specific arrangement of steps shown in FIG. 3 should not be construed as limiting the scope of the invention.

Initially in ST 301, a first user message is received, from a user mobile device that identifies a registered unique keyword maintained by the GTP. As described above, the registered unique keyword may be registered with the GTP by a publisher of a textsite identified by the registered unique keyword while the user device may be a mobile phone or other computing devices. By sending the registered unique keyword in the first user message, the user is requesting access to (i.e., to browse) the textsite associated with the registered unique keyword. In one or more embodiments of the invention, the GTP and/or the publisher may distribute an advertisement containing the registered unique keyword in a commercial promotion. Accordingly, the user may obtain the registered unique keyword from the advertisement. Alternatively, in one or more embodiments of the invention, the GTP may send, in response to receiving a request from the user device, a GTP message identifying a number of sample registered unique keywords from which the user may select a particular one to be included in the first user message. For example, the sample registered unique keywords may be registered with the GTP by a number of different publishers. In one or more embodiments, the request for a listing of registered unique keywords may be received from the user device in a second user message containing a pre-designated keyword defined specifically for requesting such a listing. Alternatively, in one or more embodiments, the user may request such a listing by simply making a conversationless call to the phone number of the GTP instead of sending the second user message to the same phone number. Using any of the approaches described above, the user may obtain a list of textsites accessible via the GTP using a single phone number (e.g., a local phone number) provided by the GDP according to a geographical location of the user. Accordingly, the user is not required to separately obtain and keep different phone numbers for accessing different textsites using a TMS.

In ST 302, authored content (e.g., access information) associated with the textsite requested by the user is retrieved based on the registered unique keyword extracted from the first user message received at the GTP. In one or more embodiments of the invention, the GTP maintains a registry containing an entry for each registered unique keyword that holds pertinent information of the textsite such as location, network address, access path, and other suitable metadata associated with the textsite. Accordingly, the access information associated with the user requested textsite may be retrieved. For example, such access information may determine whether the requested textsite is hosted on a server of the GTP or a third party server separate from the GTP.

In ST 303, the textsite is accessed based on the retrieved authored content (e.g., access information) to retrieve a navigating keyword. For example, a portion of the navigating keywords of the textsite may be retrieved. In another example, the navigating keyword may be retrieved by retrieving a home text page from the textsite that contains the navigating keyword. Generally speaking, some navigating keyword may be an alphanumeric string (e.g., location, Pita Wraps, Panini, Entrees, etc.) that is meaningful to the user but requires many keys to enter into the user device while other navigating keyword may be a short string (e.g., loc, PW, P, E, 1, 2, 3, etc.) that is easy to enter but less meaning to the user for selection. To assist the user in selecting a navigating keyword from a GTP message and to key in the selected navigating keyword when composing a reply user message, a cryptic navigating keyword (e.g., loc, PW, P, E, 1, 2, 3, etc.) may be associated with a meaningful label (e.g., location, Pita Wraps, Panini, Entry, etc.) and displayed together (e.g., loc>location, PW>Pita Wraps, P>Panini, E>Entrees, 1>location, 2>Pita Wraps, 3>Panini, etc.) in the text page delivered via the GTP message. Similarly, a meaningful navigating keyword (e.g., location, Pita Wraps, Panini, Entry, etc.) may be associated with a short hand identifier (e.g., loc, PW, P, E, 1, 2, 3, etc.) and displayed together (e.g., loc>location, PW>Pita Wraps, P>Panini, E>Entrees, 1>location, 2>Pita Wraps, 3>Panini, etc.) in the text page delivered via the GTP message. The meaningful label and the short hand identifier are referred to as a representation of the navigating keyword. In one or more embodiments, representations of the navigating keyword may also include formats different from the meaningful label and/or the short hand identifier.

In ST 304, a first GTP message containing the retrieved navigating keyword is sent to the user device in response to receiving the first user message. In one or more embodiments, the first GTP message includes the retrieved portion of the textsite navigating keywords. In one or more embodiments, the first GTP message includes the text page containing the retrieved navigating keyword. For example, the home text page of the textsite may be sent to the user device in the first GTP message as a reply to the first user message containing the registered unique keyword. Accordingly, the user may access a desired text page from the home text page by selecting a corresponding navigating keyword contained in the home text page. In one or more embodiments, a text page also contains, as defined by the publisher, representations of included navigating keywords for ease of user selection. For example, each of the navigating keywords in the home text page sent in the first GDP message may be accompanied by a meaningful label or a short hand identifier. Accordingly, the user may specify (or identify) a desired text page by including either a corresponding navigating keyword or a representation of such navigating keyword in a second user message replying to the first GTP message. In ST 305, this second user message is received at the GTP.

As noted above, navigating keyword information (e.g., access information such as location, address, or other information enabling access to a text page pointed to by a navigating keyword) and navigation paths to text pages in the textsite are stored in the textsite map. In one or more embodiments of the invention, information regarding meaningful labels, short hand identifiers, or other keyword representations for a navigating keyword in a text page is also included in the textsite map. In ST 306, the desired text page is identified according to the textsite map based on either the navigating keyword or a representation (e.g., a meaningful label, short hand identifier) thereof extracted from the second user message. Further, the desired text page is retrieved by looking up access information in the textsite map accordingly.

In ST 307, the desired text page is included in a second GTP message and sent, as reply to the second user message, to the device for display to the user.

In ST 308, a third user message is received from the device while displaying the first text page. The third user message includes a pre-designated keyword (e.g., " ", "0", " . . . ", etc.). For example, the pre-designated keyword may be defined specifically for accessing a home text page of the textsite. In response, the GTP sends the home text page to the device in a third GTP message (ST 309). In another example, the pre-designated keyword may be defined specifically for accessing a previous text page sent to the device prior to the text page in a navigation trace. An example navigation trace is described with reference to FIGS. 5-5J below. In response, the GTP sends the previous text page to the device in the third GTP message (ST 309). In still another example, the pre-designated keyword may be defined specifically for accessing a forward text page sent to the device subsequent to the text page in the navigation trace. In response, the GTP sends the forward text page to the device in a third GTP message (ST 309). In yet another example, the pre-designated keyword may be defined specifically for subscribing to updates of a currently displayed text page. In response, the GTP sends updated versions of the currently displayed text page in a push mode to the device from time to time in recurring GTP messages (ST 309).

While the description above regarding ST 301 through ST 309 relates to a textsite published by a publisher under a registered unique keyword, the user may obtain another registered unique keyword separately registered with the GTP by another publisher of another textsite. During navigation of the currently displayed textsite, a user message may be received identifying a second registered unique keyword. For example, such user message may include either the second registered unique keyword or a representation thereof. In response, the GTP redirects the user device from the currently navigated textsite to the second textsite (ST 310). Accordingly, the GTP may exchange text messages with the device for navigating the second textsite using a second set of navigating keywords according to a second textsite map of the second textsite. Accordingly, in one or more embodiments, the user may switch back and forth between different textsites published by different publishers without the need to change the phone number to which the text messages are sent in the middle of the textsite navigation.

As described above, there are several different approaches as to how a user may obtain a list of all textsites accessible via the GTP regardless of which publisher authored the content. An additional scenario in which the user may obtain additional registered unique keywords is from a text page having an embedded external link, as authored by the publisher and is consistent with the textsite map. In this scenario, a user message may be redirected to a second or third textsite as described above. Further, the text page may include a short hand identifier for the embedded external link in which case the user message may just include the short hand identifier for quick redirection.

In some scenarios, the second textsite described above is converted from a website, for example, using the adaptor described in reference to FIG. 2 above. In such scenarios, the second navigating keyword may be registered for the website where a corresponding registry entry specifies a particular adaptor plug-in for use to map between a website map of the website and a textsite map converted from the website map. Specifically, a navigating keyword received in a user message during navigation of the converted website is processed using the textsite map, the adaptor plug-in, and the website map to retrieve access information associated with a corresponding webpage. Subsequently, the webpage may be retrieved and converted dynamically (i.e., on demand) into a text page for sending to the user device. Alternatively, a pre-converted text page may be stored and retrieved for sending to the user device (ST 311).

Although the description above with respect to FIGS. 5A through 5J generally refers to messages exchanged between the GTP and the user device as text messages transmitted via TMS, those skilled in the art with the benefit of this disclosure will appreciate that the invention is not intended to be limited to exchanges exclusively in text messages or using a TMS. For example, the GTP may provide functionalities to allow a user switching back and forth between browsing textsites via Internet using a computing device and navigating the textsites via telecommunication network using a mobile phone in a seamless fashion with uninterrupted handovers.

Figure 4:
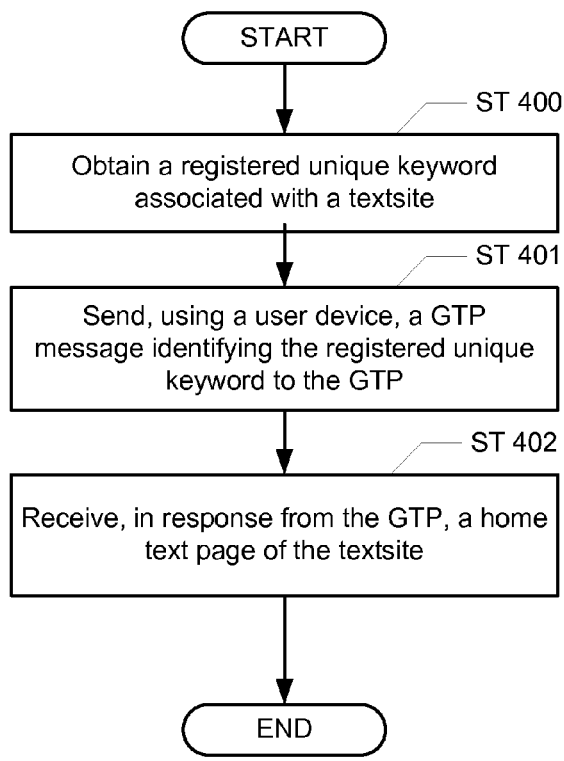
FIG. 4 shows a flow chart for using a global textsite platform in accordance with one or more embodiments of the invention.

FIG. 4 shows a flow chart for accessing content maintained by the global textsite platform by a user in accordance with one or more embodiments of the invention. In one or more embodiments of the invention, one or more of the steps shown in FIG. 4 may be omitted, repeated, and/or performed in a different order than that shown in FIG. 4. Accordingly, the specific arrangement of steps shown in FIG. 4 should not be construed as limiting the scope of the invention.

Initially, a user obtains a registered unique keyword for a desired textsite (ST 400). Specifically, in one or more embodiments of the invention, a user may obtain a registered unique keyword through an advertisement for the registered keyword. Upon obtaining the registered keyword for the desired textsite that the user wishes to browse or obtain information regarding, the user sends, using a mobile device, a text message including the unique keyword to a local number of the global textsite platform (ST 401). More specifically, the user sends a text message via a TMS, such as SMS or MMS, to a local number corresponding to a geographic location of the user. The text message includes the registered keyword for the desired textsite. Those skilled in the art will appreciate that the user may be in any global geographic location when requesting access to a textsite, as access to the platform is globally available to any user with TMS functionality on a mobile device.

Subsequently, the user receives a response from the global textsite platform including the homepage of the textsite that is associated with the registered unique keyword sent by the user (ST 402). At this stage, the user may communicate with the global textsite platform by exchanging a series of text messages (i.e., user messages) and receiving text message responses (i.e., GTP messages) to navigate the textsite. Examples of screen shots detailing what a user text message and a response from the global textsite platform may look like are described in reference to FIGS. 5A-5J below.

FIGS. 5A-5J show various screen shots illustrating examples of accessing content hosted by a global textsite platform in one or more embodiments of the invention. Although FIGS. 5A-5J show implementation examples of embodiments of the invention, those skilled in the art will appreciate that there may be other ways in which to implement embodiments of the invention, and that the example screen shots are not meant to limit the scope of the invention. Throughout FIGS. 5A-5J, a text page delivered in a GTP message and the GTP message delivering the text page may both be referred to using the same reference numerals.

Figure 5A:
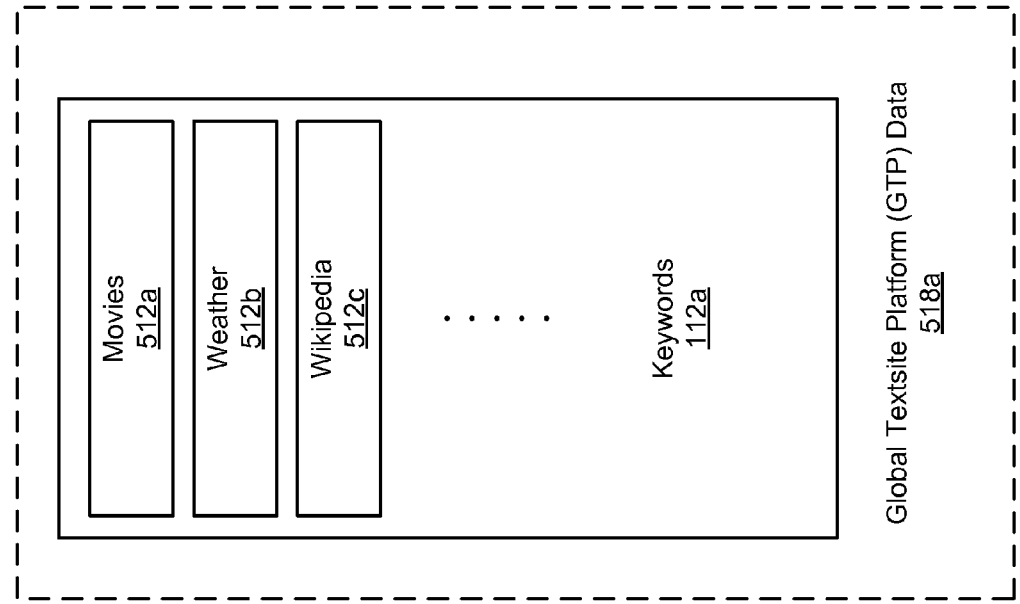
FIGS. 5A-5J show screen shots of an exemplary global textsite platform in accordance with one or more embodiments of the invention.
Figure 5A:
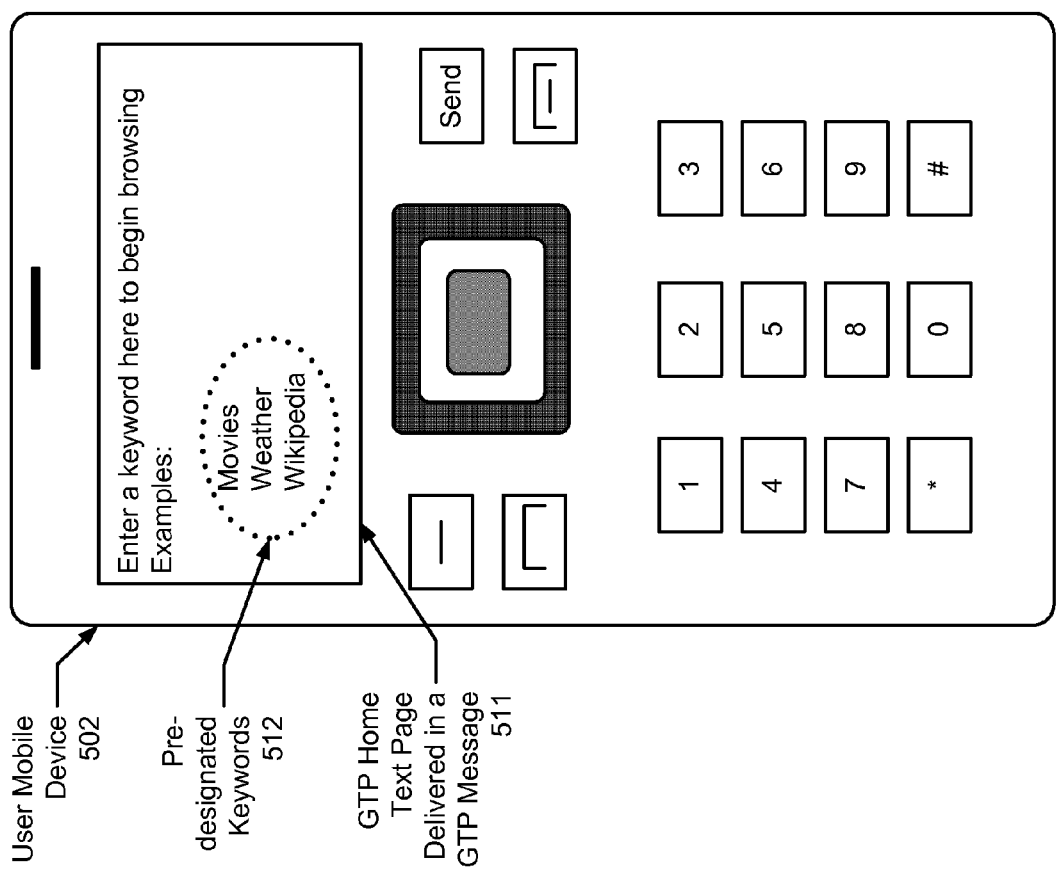

FIG. 5A shows the user mobile device (502) displaying an example GTP home text page, which is delivered via TMS in a GTP message (511). As noted above, this GTP home text page may be sent in the GTP message (511) in response to a request from a user. For example, the user may send a request message in a pre-designated format (e.g., with blank content or with content associated with another pre-designated keyword) using a phone number of the GTP to request the GTP home text page. In another example, the user may have made a conversationless telephone call to the phone number of the GTP to request the GTP home text page. As shown in FIG. 5A, the GTP home text page includes pre-designated keywords (512) listed as movies, weather, and Wikipedia. For example, these pre-designated keywords are stored in the keywords (112a) of GTP data (518a) corresponding to the keywords (112) shown in FIG. 2 above. The keywords (112a) includes pre-designated keyword entries of movies (512a), weather (512b), and Wikipedia (512c) corresponding to sample textsites or generic textsites included in and/or hosted by the GTP.

Figure 5B:
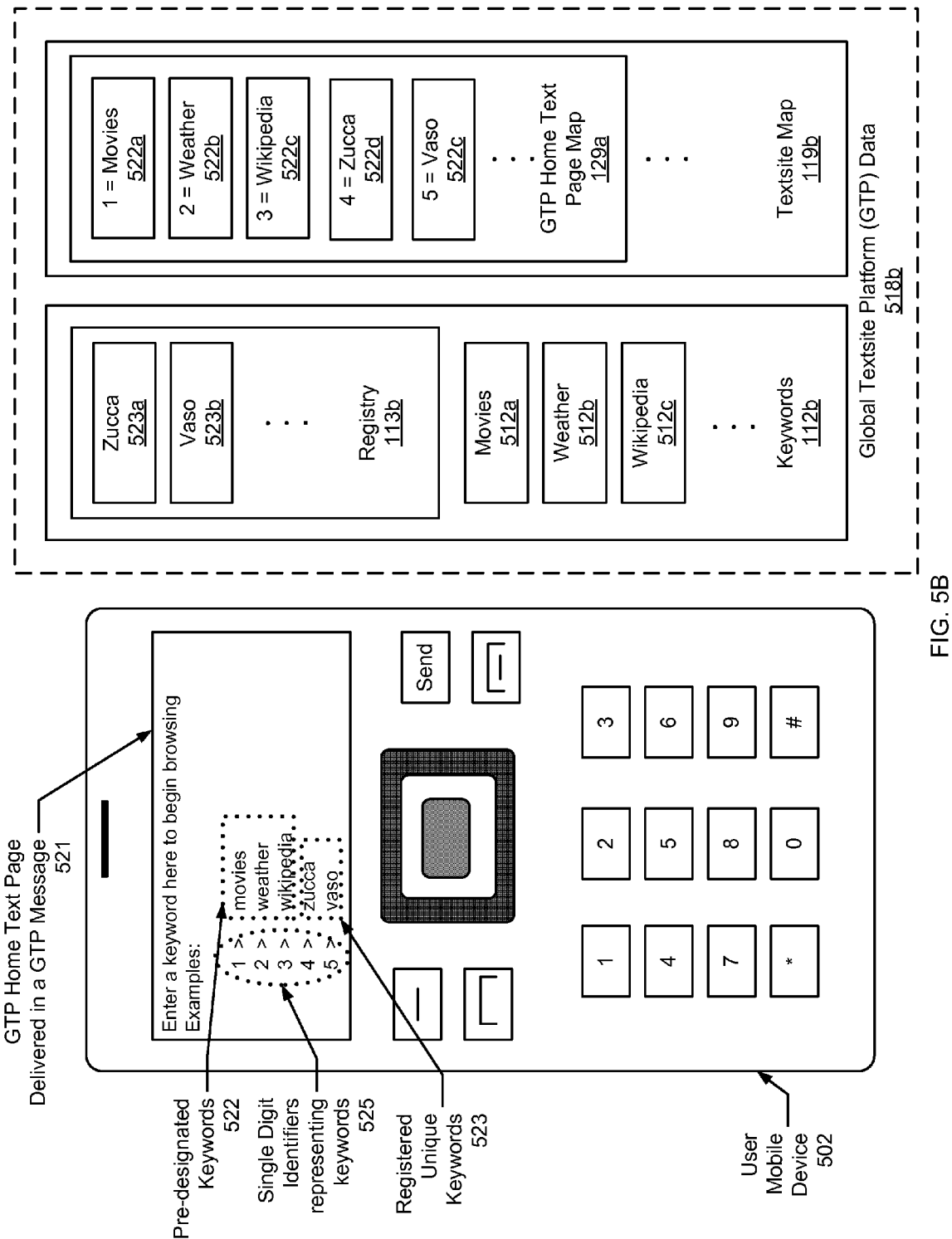

FIG. 5B shows the user mobile device (502) displaying another example GTP home text page delivered in a GTP message (521), which may be requested and delivered in essentially same way as the example GTP home text page described in reference to FIG. 5A above. In the example GTP home text page shown in FIG. 5B, the pre-designated keywords (522) are essentially the same as the pre-designated keywords (512) described above while followed by registered unique keywords (523) listed as zucca and vaso. Accordingly, keywords (112b) of the GTB data (518b) include a registry (113b) in addition to the pre-designated keyword entries movies (512a), weather (512b), and wikipedia (512c). As shown, the registry (113b) includes keyword entries zucca (523a) and vaso (523b), which are linked to access information (not shown) to the respective textsites associated with those keywords.

Further as shown in FIG. 5B, short hand identifiers (525) (i.e., 1, 2, 3, 4, and 5) are displayed next to and represent pre-designated keywords (522) and registered unique keywords (523) for user selection in the example GTP home text page delivered in the GTP message (521). For example, zucca and vaso of the registered unique keywords (523) correspond to a restaurant textsite and a bookstore textsite, respectively. As described above, the user may include either the keyword "zucca" or the corresponding short hand identifier "4" when replying to the GTP message (521) to access the restaurant textsite. To facilitate this, a textsite map (119b) of the GTB data (518b) includes GTP home text page map (129a) containing entries for describing representations of the keywords using the short hand identifiers (525) and for describing access information authored for the for respective textsites.

As described above, the registered unique keywords zucca and vaso may be registered with the GTP by the respective restaurant and bookstore owners who created their own textsites or registered by contracted publishers on their behalf. Further, the zucca textsite may be hosted on a server of the GTP while the vaso textsite may be hosted on a third party server separate from the GTP.

Figure 5F:
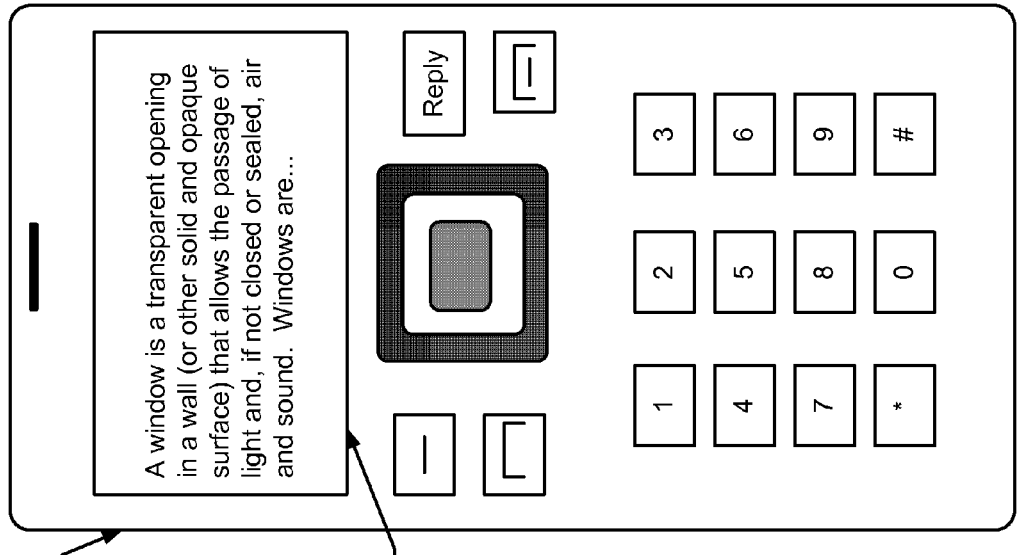
Figure 5C:
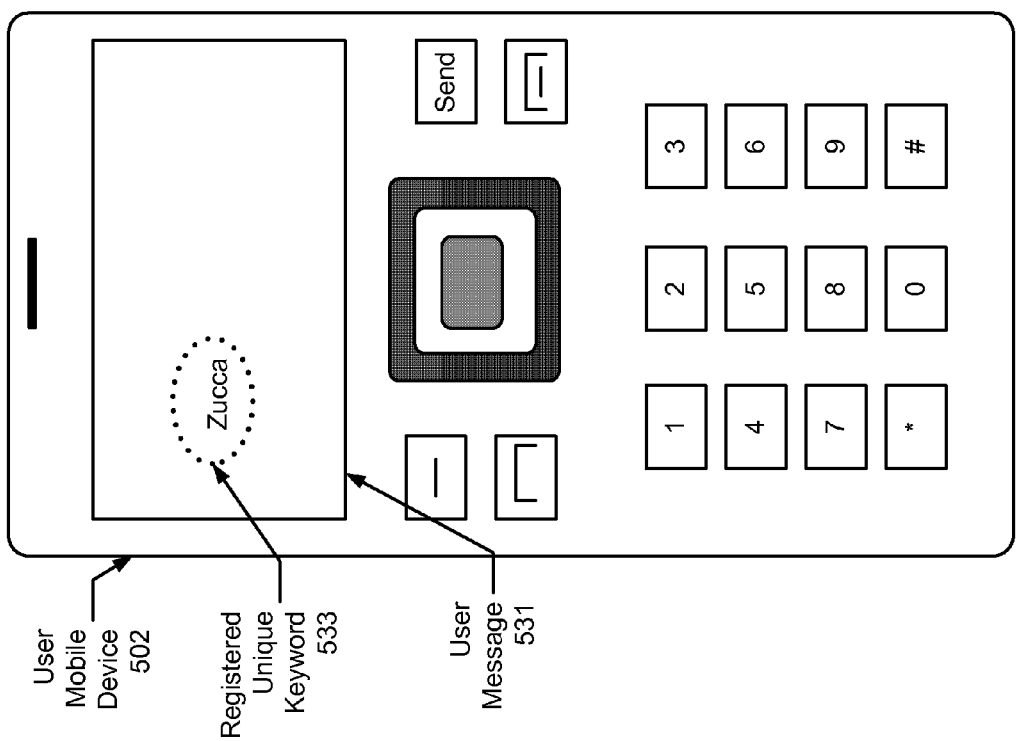

FIG. 5C shows the user mobile device (502) displaying an example user message (531) containing the registered unique keyword (533) (i.e., zucca) as selected by the user from the example GTP home text page shown in FIG. 5B above. Alternatively, the registered unique keyword (533) may be obtained by the user from an advertisement distributed, for example, by restaurant zucca in a commercial promotion.

Figure 5D:
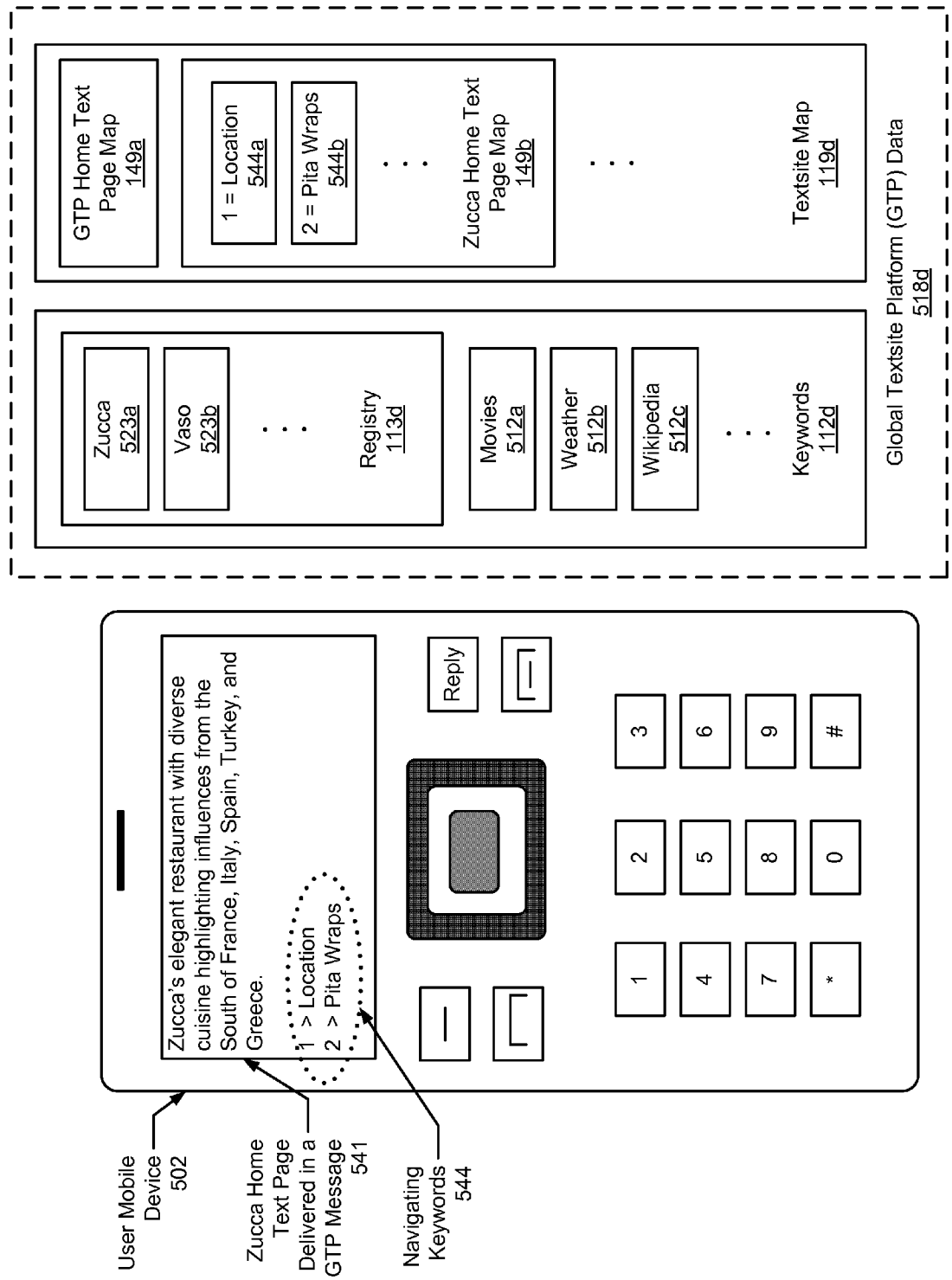

FIG. 5D shows the user mobile device (502) displaying an example home text page of the textsite for restaurant Zucca, which is delivered in a GTP message (541) in response to the user message (531) described above. As shown, the example zucca home text page includes navigating keywords and representations thereof (544) listed as "1>location" and "2>pita wrap". For example, "1" may be considered the navigating keyword while "location" is the meaningful label. Alternatively, "location" may be considered the navigating keyword while "1" is the short hand identifier. In either case, the aforementioned navigating keywords and representations thereof are displayed together for user selection in the zucca home text page. In the example shown in FIG. 5D, the GTP data (518d) is essentially the same as the GTP data (518b) shown in FIG. 5B above with an additional zucca home text page map (149b) included in the textsite map (119d). As described above, the zucca home text page map (149a) contains entries for describing representations of the navigating keywords using the meaningful labels or short hand identifiers within the zucca home text page and for describing access information for respective text pages referenced by the navigating keywords. For example, including either the navigating keyword or the corresponding representation (i.e., either one of "location" or "1") in a user message replying to the GTP message (541) results in a text page containing address and driving direction information of the zucca restaurant being identified by the GTP. The address and driving direction information (i.e., the authored content for the text page associated with the navigating keyword (i.e., "location" or "1") is then delivered to the user mobile device (502) in a subsequent GTP message. As described above, the representation of navigating keywords (544) using meaningful labels or short hand identifiers and the use of navigating keywords (544) to index the respective text pages are applicable only within the displayed text page, which is the zucca home text page, in this instance. Said another way, and as illustrated in FIGS. 5G and 5H below, the keyword "location" or "1" may be associated with different effects when used in a context other than replying to a GTP message delivering the zucca home text page.

Figure 5E:
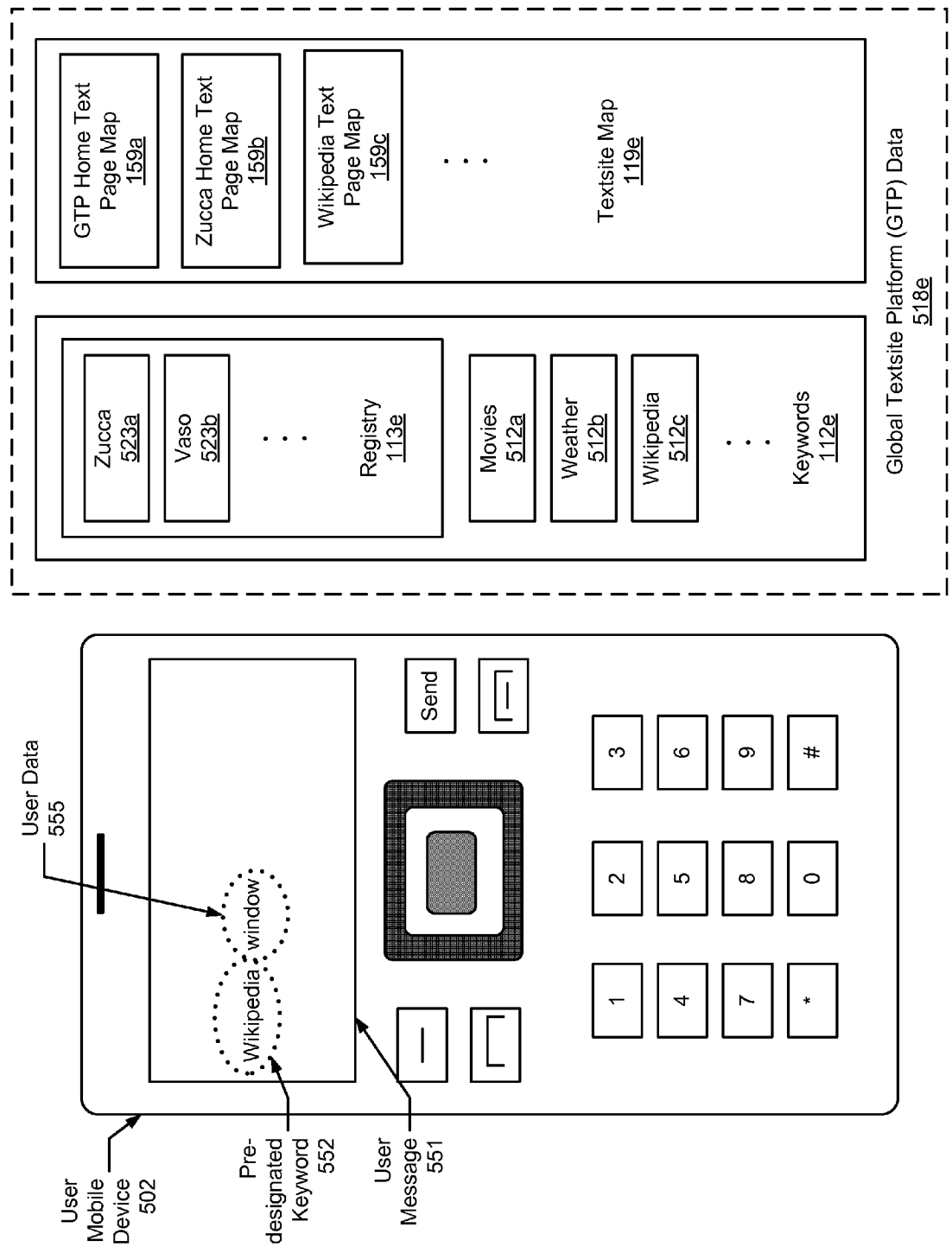

FIG. 5E shows the user mobile device (502) displaying an example user message (531) containing the pre-designated keyword (552) (i.e., Wikipedia) as selected by the user from the example GTP home text page shown in FIG. 5B above or otherwise obtained by the user from an advertisement distributed, for example, by an operator of the GTP promoting built-in features of the GTP. As shown in FIG. 5E, the pre-designated keyword (552) (i.e., Wikipedia) is followed by user data (555) (i.e., "window") in the user message (551) to initiate a search for information relating to user data (555) (i.e., "window") within the Wikipedia textsite. To facilitate this, textsite map (119e) of the GTP data (518e) includes Wikipedia text page map (159c) describing relevant syntax information applicable to the Wikipedia textsite. For example, the Wikipedia text page map (159c) may relate to a home text page or a text page other than the home text page of the Wikipedia textsite.

FIG. 5F shows the user mobile device (502) displaying an example wikipedia text page delivered in a GTP message (561) responding to the user message (531) described above. As shown, the example wikipedia text page contains search result relating to the user data (555) (i.e., "window").

Figure 5G:
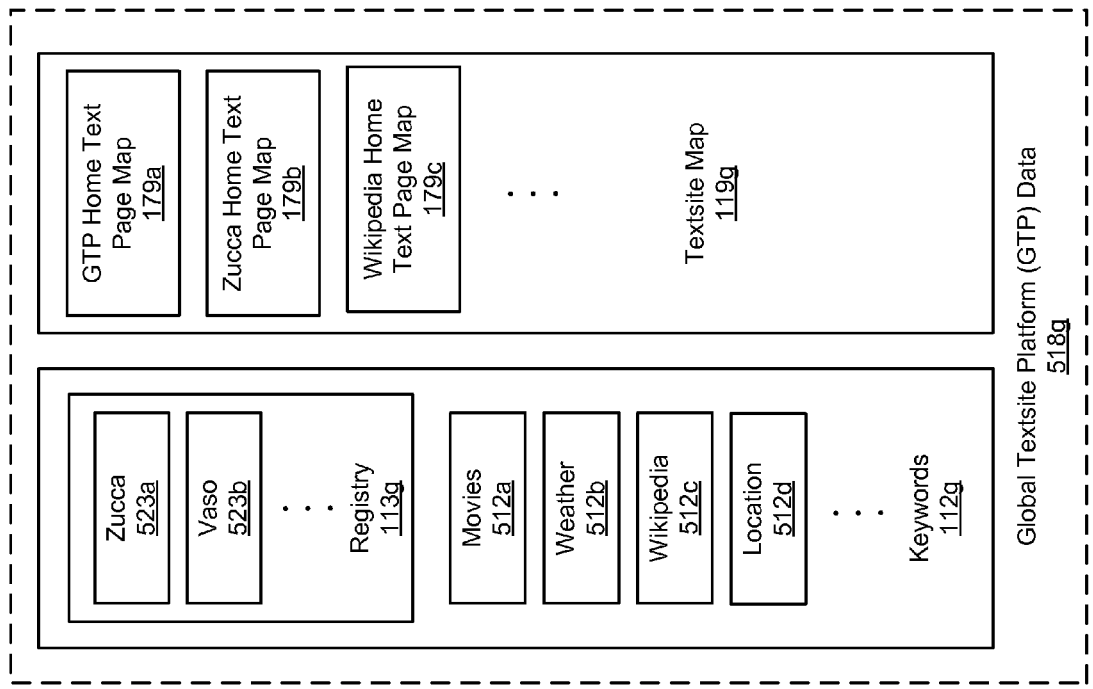
Figure 5G:
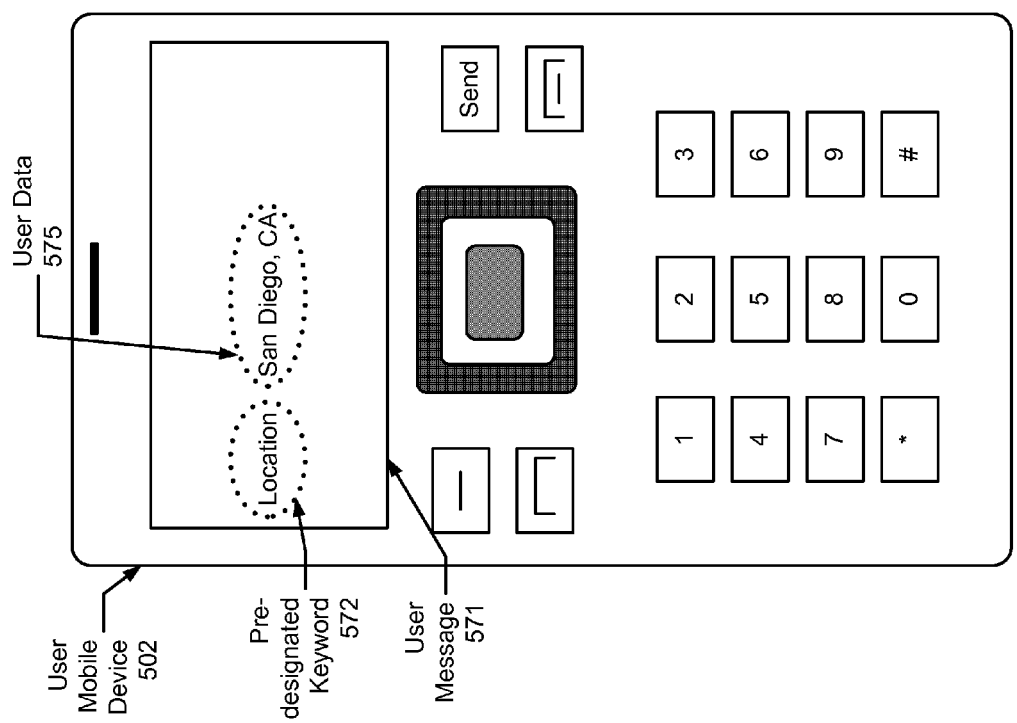
Figure 5H:
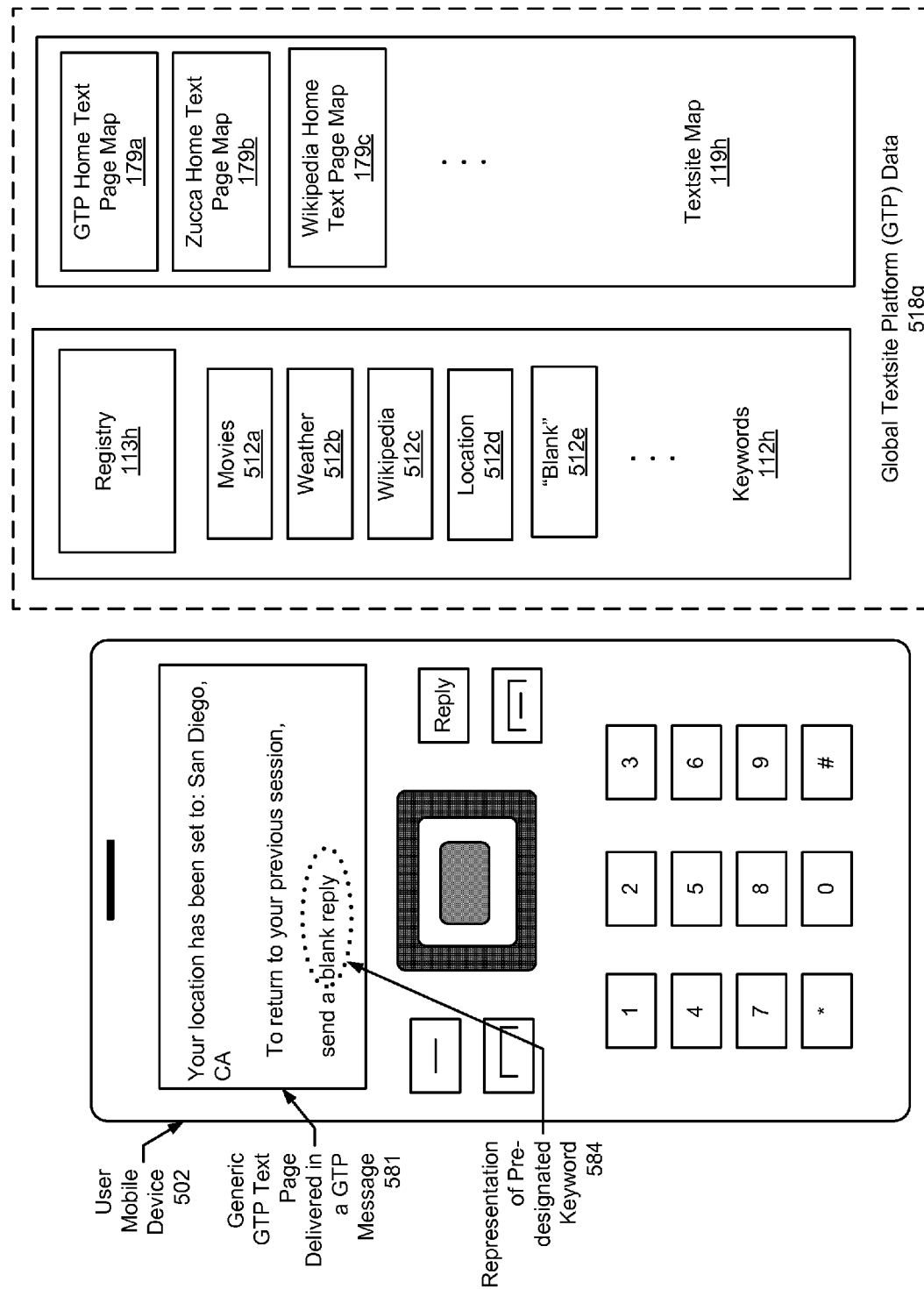

FIG. 5G shows the user mobile device (502) displaying an example user message (571) containing the pre-designated keyword (572) (i.e., location, as reflected by the entry location (512d) in keywords (112g) of the GTP data (518g)), for example obtained by the user in a GTP user guide (e.g., online user guide). As shown in FIG. 5E, the pre-designated keyword (572) (i.e., location) is followed by user data (575) (i.e., "San Diego") in the user message (571) to set a global user location parameter throughout the GTP. Accordingly, for example and as described in FIGS. 5I and 5J below, a textsite registered with the GTP may utilize the this global user location parameter set by the user for performing related activities, such as searching for weather information associated with the user location reflected in this global user location parameter. In another example, the textsite may overwrite this global user location parameter by a locally defined location keyword, as described in FIG. 5D above.

FIG. 5H shows the user mobile device (502) displaying an example GTP text page delivered in a GTP message (581) responding to the user message (571) described above. As shown, the example GTP text page contains confirmation to the user data (575) (i.e., "San Diego") and navigating tips describing a pre-designated keyword " " represented by the word "blank" (584) as reflected by the entry "blank" (512e) in keywords (112h) of the GTP data (518h). Based on the displayed navigating tips, the GTP may identify a previous session (e.g., a previous text page) from a user navigation trace for delivering to the user mobile device (502) upon receiving a user message containing the pre-designated keyword " " represented by the word "blank" (584). An example user navigation trace is the sequence of textsites traversed by the user as illustrated in FIGS. 5A through 5G above, which may be tracked by the GTP for assisting user textsite navigation. Other examples of pre-designated navigating keywords or syntax associated with the GTP may include a globally reserved single text digit (e.g., "0") or text string (e.g., " . . . ") used for re-directing to a home page of the currently displayed textsite, a forward text page in the user navigation trace, or other pre-defined text pages. Similar to the use of the pre-designated keyword "location" (572), such pre-designated navigating keywords (e.g., " ", "0", " . . . ", etc.) may be utilized or overwritten by a textsite based on syntax information defined in a corresponding textsite map by the publisher.

Figures 5I, 5J:
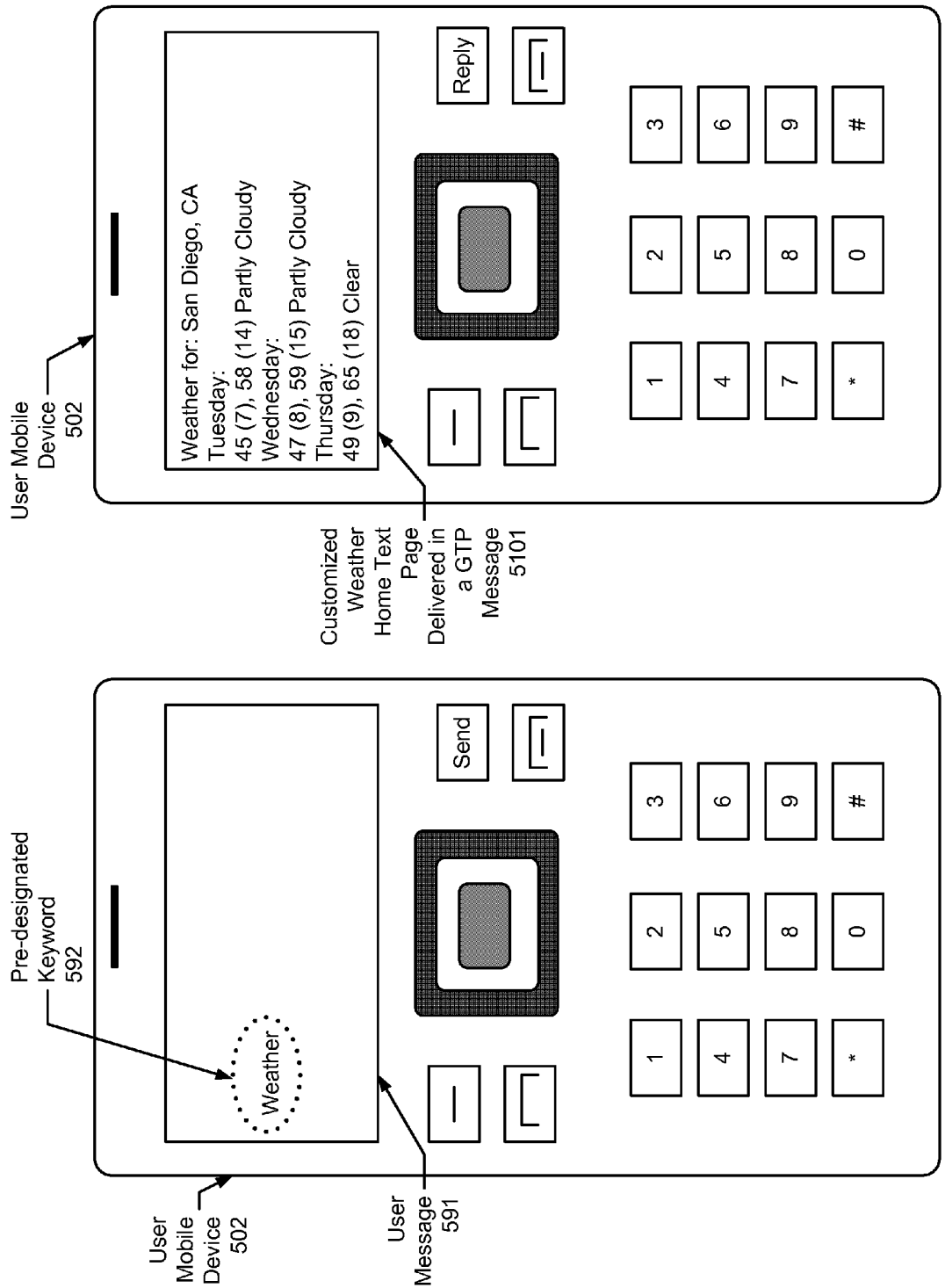

FIG. 5I shows the user mobile device (502) displaying an example user message (591) containing the pre-designated keyword (592) (i.e., weather) as selected by the user from the example GTP home text page shown in FIG. 5B above or otherwise obtained by the user from an advertisement distributed, for example, by an operator of the GTP promoting built-in features of the GTP.

FIG. 5J shows the user mobile device (502) displaying an example weather text page maintained by the GTP, which is delivered in a GTP message (5101) in response to the user message (591) described above. As shown, the example weather text page illustrate a customized home text page for the weather textsite defined by the global user location parameter described in FIGS. 5G and 5H above.

Although the GTP data are in specific formats and organizations in the examples described in reference to FIGS. 5A-5J above, those skilled in the art with the benefit of this disclosure will recognize that GTP data may be in other formats or organizations without deviating from the spirit of the invention.

Embodiments of the invention provide a globally accessible platform that provides access to content via a TMS to mobile device users that may not subscribe to a data plan for obtaining information via web browsing or by connecting to the Internet. Specifically, embodiments of the invention provide global textsite platform for creating, maintaining, and providing access to textsites created by the global textsite platform or by publishers/developers/service providers of content. The global textsite platform is globally accessible by publishers/developers/service providers authoring content, and by users browsing the content on textsites, in any geographic location.

Figure 6:
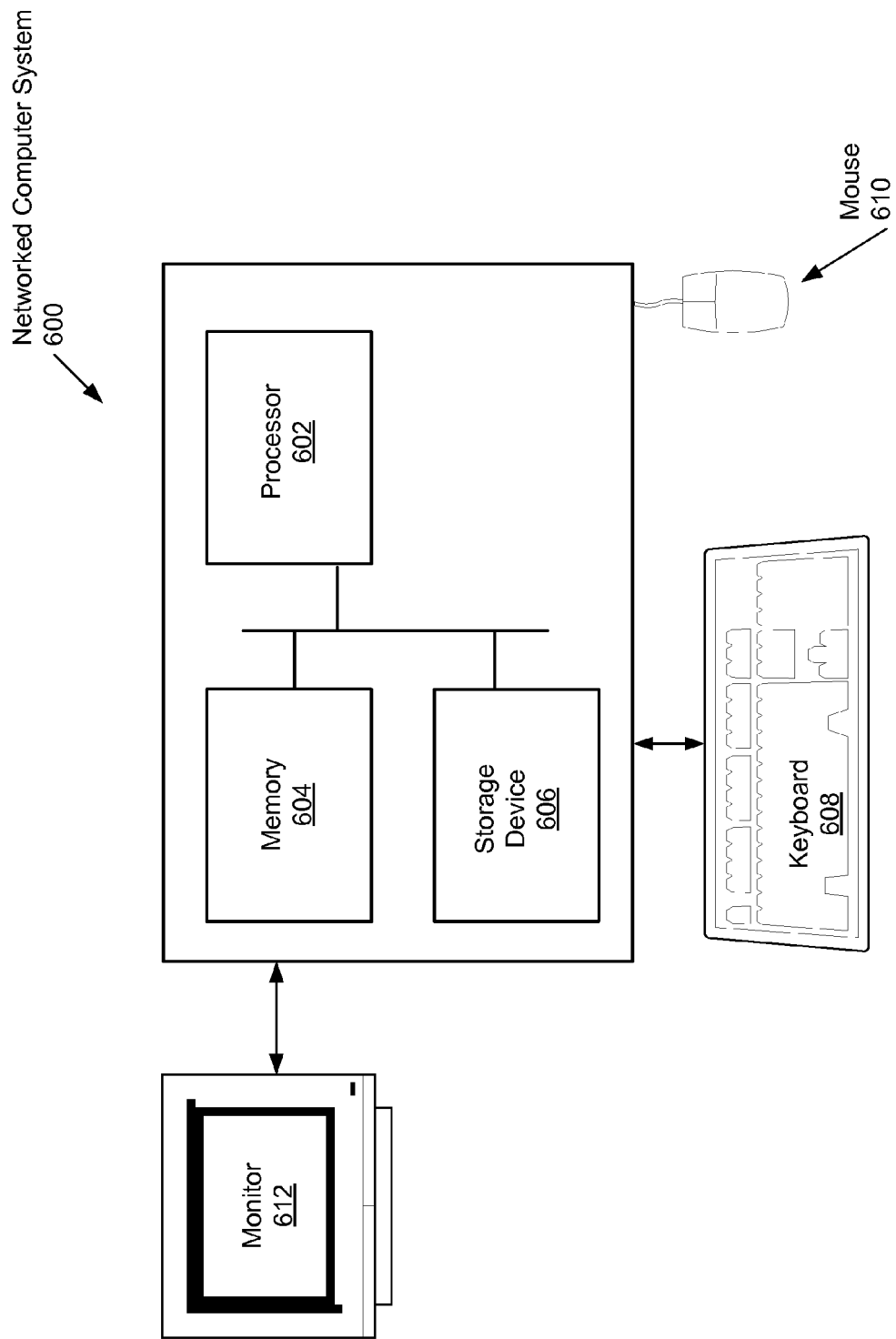
FIG. 6 shows a flow diagram of a computer system in accordance with one or more embodiments of the invention.

The invention may be implemented on virtually any type of computer regardless of the platform being used. For example, as shown in FIG. 6, a networked computer system (600) includes a processor (602), associated memory (604), a storage device (606), and numerous other elements and functionalities typical of today's computers (not shown). The networked computer (600) may also include input means, such as a keyboard (608) and a mouse (610), and output means, such as a monitor (612). The networked computer system (600) is connected to a local area network (LAN) or a wide area network (e.g., the Internet) (not shown) via a network interface connection (not shown). Those skilled in the art will appreciate that these input and output means may take other forms, now known or later developed. Further, those skilled in the art will appreciate that one or more elements of the aforementioned computer (600) may be located at a remote location and connected to the other elements over a network.

Further, the invention may be implemented on a distributed system having a plurality of nodes, where each portion of the invention may be located on a different node within the distributed system. In one or more embodiments of the invention, the node corresponds to a computer system. Alternatively, the node may correspond to a processor with associated physical memory.

In one or more embodiments of the invention, software instructions to perform embodiments of the invention, when executed by a processor, may be stored on a tangible computer readable medium such as a compact disc (CD), a diskette, a tape, or any other tangible computer readable storage device. Further, one or more embodiments of the invention may be implemented as an Application Program Interface (API) executing on a computer system(s), where the API includes one or more software instructions.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for providing access to content using a global textsite platform (GTP) comprising:
   receiving, from a device of a user, a first user message identifying a registered unique keyword maintained by the GTP, wherein the registered unique keyword is registered with the GTP by a publisher for accessing a textsite comprising a plurality of text pages published by the publisher and indexed based on a plurality of navigating keywords defined by the publisher;
   retrieving authored content associated with the textsite based on the registered unique keyword;
   accessing the textsite based on the authored content to retrieve a navigating keyword of the plurality of navigating keywords, the navigating keyword indexing a text page within the plurality of text pages;
   sending, to the device and in response to receiving the first user message, a first GTP message comprising the navigating keyword for the user to access the text page,
   wherein the first user message and the first GTP message comprise a first text message transmitted using a text messaging service (TMS); and
   converting the textsite from a website by mapping the navigating keyword to a link of the website, and converting a webpage of the website indexed by the link to the text page indexed by the navigating keyword.

2. The method of claim 1, further comprising:
   including a representation of the navigating keyword in the first GTP message;
   receiving, from the device and in response to sending the first GTP message, a second user message comprising at least one selected from a group consisting of the navigating keyword and the representation of the navigating keyword;
   identifying and retrieving the text page based on the at least one selected from a group consisting of the navigating keyword and the representation of the navigating keyword; and
   sending, to the device and in response to receiving the second user message, a second GTP message comprising the text page for display on the device,
   wherein one or more of the second user message and the second GTP message comprise a second text message transmitted using the text messaging service (TMS).

3. The method of claim 2, further comprising:
   including, as authored by the publisher, a portion of the plurality of navigating keywords and corresponding representations thereof in the first GTP message for selection by the user,
   wherein the at least one selected from a group consisting of the navigating keyword and the representation of the navigating keyword is selected from the portion of the plurality of navigating keywords and the corresponding representations by the user.

4. The method of claim 2, further comprising:
   receiving from the device while displaying the text page, a third user message comprising a pre-designated keyword for accessing one of a home text page of the textsite, a previous text page sent to the device prior to the text page in a navigation trace, and a forward text page sent to the device subsequent to the text page in the navigation trace, and
   sending, to the device and in response to receiving the third user message, a third GTP message comprising the one of the home text page, the previous text page, and the forward text page.

5. The method of claim 1, further comprising:
   providing, to the user, another registered unique keyword maintained by the GTP, wherein the another registered unique keyword is registered with the GTP by another publisher for accessing another textsite comprising another plurality of text pages published by the another publisher and indexed based on another plurality of navigating keywords defined by the another publisher, wherein the publisher and the another publisher are separate from an operating entity of the GTP,
   receiving, from the device, a second user message identifying the another registered unique keyword; and
   exchanging text messages with the device for navigating the another textsite using the another plurality of navigating keywords.

6. The method of claim 5,
   wherein the text page comprises, as authored by the publisher, the another registered unique keyword, and
   wherein the second user message is sent from the device for redirecting from the textsite to the another textsite based on user selection.

7. The method of claim 5, wherein the another textsite is converted from another website, the method further comprising:
   mapping another navigating keyword to another link of the another website; and
   converting another webpage of the another website indexed by the another link to another text page indexed by the another navigating keyword.

8. The method of claim 5, wherein at least one selected from the textsite and the another textsite is hosted on a server of the GTP.

9. The method of claim 5, wherein at least one selected from the textsite and the another textsite is hosted on a third party server separate from the GTP.

10. The method of claim 1, further comprising:
    distributing an advertisement associated with the GTP and the publisher, the advertisement comprising the registered unique keyword.

11. The method of claim 1, further comprising:
    receiving a request for the GTP from the device;
    sending, to the device and in response to receiving the request, a second GTP message identifying a plurality of registered unique keywords from which the user selects the registered unique keyword,
    wherein the plurality of registered unique keywords are registered with the GTP by a plurality of publishers.

12. The method of claim 11, wherein receiving the request comprises:
    receiving, from the device, a second user message comprising pre-designated keyword for requesting the plurality of registered unique keywords.

13. The method of claim 11, wherein receiving the request comprises:
    receiving a conversationless phone call from the device using a phone number of the GTP.

14. A system for providing content using a global textsite platform (GTP) comprising:
    a repository storing a registry comprising a plurality of registered unique keywords, wherein a registered unique keyword, and metadata associated therewith, of the plurality of registered unique keywords are stored in a entry of the registry, the metadata containing access information to a textsite of a plurality of textsites indexed based on the plurality of registered unique keywords, and wherein the registered unique keyword is registered with the GTP by a publisher of the textsite comprising a plurality of text pages published by the publisher and indexed based on a plurality of navigating keywords defined by the publisher for navigating the textsite;

a processor; and memory storing instructions when executed by the processor comprising functionalities to:
- receive, from a device of a user, a first user message identifying the registered unique keyword;
- retrieve the metadata from the registry based on the registered unique keyword;
- access the textsite based on the metadata to retrieve a navigating keyword of the plurality of navigating keywords, the navigating keyword indexing a text page within the plurality of text pages; and
- send, to the device and in response to receiving the first user message, a first GTP message comprising the navigating keyword for the user to access the text page, wherein the first user message and the first GTP message comprise a first text message transmitted using a text messaging service (TMS), wherein the textsite is converted from a website by:
- mapping a navigating keyword to a link of the website; and
- converting a webpage of the website indexed by the link to the text page indexed by the navigating keyword.

15. The system of claim 14, the instructions when executed by the processor further comprising functionality to:
- include a representation of the navigating keyword in the first GTP message;
- receive, from the device and in response to sending the first GTP message, a second user message comprising at least one selected from a group consisting of the navigating keyword and the representation of the navigating keyword;
- identify and retrieve the text page based on the at least one selected from a group consisting of the navigating keyword and the representation of the navigating keyword; and
- send, to the device and in response to receiving the second user message, a second GTP message comprising the text page for display on the device, wherein one or more of the second user message and the second GTP message comprise a second text message transmitted using the text messaging service (TMS).

16. The system of claim 15, the instructions when executed by the processor further comprising functionality to:
- include, as authored by the publisher, a portion of the plurality of navigating keywords and corresponding representations thereof in the first GTP message for selection by the user, wherein the at least one selected from a group consisting of the navigating keyword and the representation of the navigating keyword is selected from the portion of the plurality of navigating keywords and the corresponding representations by the user.

17. The system of claim 15, the instructions when executed by the processor further comprising functionalities to:
- receive, from the device while displaying the text page, a third user message comprising a pre-designated keyword for accessing one of a home text page of the textsite, a previous text page sent to the device prior to the text page in a navigation trace, and a forward text page sent to the device subsequent to the text page in the navigation trace, and
- send, to the device and in response to receiving the third user message, a third GTP message comprising the one of the home text page, the previous text page, and the forward text page.

18. The system of claim 15, wherein another registered unique keyword, and another metadata associated therewith, of the plurality of registered unique keywords are stored in another entry of the registry, the another metadata containing access information to another textsite of the plurality of textsites, wherein the another registered unique keyword is registered with the GTP by another publisher of the another textsite comprising another plurality of text pages published by the another publisher and indexed based on another textsite map comprising another plurality of navigating keywords defined by the another publisher for navigating the another textsite, and wherein the publisher and the another publisher are separate from an operating entity of the GTP, the instructions when executed by the processor further comprising functionalities to:
- receive, from the device, a second user message identifying the another registered unique keyword; and
- exchange text messages with the device for navigating the another textsite using the another plurality of navigating keywords.

19. The system of claim 18, wherein the text page comprises, as authored by the publisher, the another registered unique keyword, and wherein the second user message is sent from the device for redirecting from the textsite to the another textsite in response to receiving the text page at the device.

20. The system of claim 18, wherein the another textsite is converted from another website, the instructions when executed by the processor further comprising functionalities to:
- map another navigating keyword to another link of the another website; and
- convert another webpage of the another website indexed by the another link to another text page indexed by the another navigating keyword.

21. The system of claim 18, further comprising:

a server configured to host at least one selected from the textsite and the another textsite.

22. The system of claim 18, wherein at least one selected from the textsite and the another textsite is hosted on a third party server separate from the GTP.

23. A non-transitory computer readable storage medium comprising software instructions for providing access to content using a global textsite platform, that when executed, comprise functionality to:
- receive, from a device of the user, a first user message identifying a registered unique keyword maintained by the GTP, wherein the registered unique keyword is registered with the GTP by a publisher for accessing a textsite comprising a plurality of text pages published by the publisher and indexed based on a plurality of navigating keywords defined by the publisher;
- retrieve authored content associated with the textsite based on the registered unique keyword;
- access the textsite based on the authored content to retrieve a navigating keyword of the plurality of navigating keywords, the navigating keyword indexing a text page within the plurality of text pages; and send, to the device and in response to receiving the first user message, a first GTP message comprising the navigating keyword for the user to access the text page, wherein the first user message and the first GTP message comprise a first text message transmitted using a text messaging service (TMS), wherein the textsite is converted from a website by:
mapping a navigating keyword to a link of the website; and
converting a webpage of the website indexed by the link to the text page indexed by the navigating keyword.

24. The non-transitory computer readable storage medium of claim 23, the software instructions, that when executed, comprise functionality to:
include a representation of the navigating keyword in the first GTP message;
receive, from the device and in response to sending the first GTP message, a second user message comprising at least one selected from a group consisting of the navigating keyword and the representation of the navigating keyword;
identify and retrieve the text page based on the at least one selected from a group consisting of the navigating keyword and the representation of the navigating keyword; and
send, to the device and in response to receiving the second user message, a second GTP message comprising the text page for display on the device,
wherein one or more of the second user message and the second GTP message comprise a second text message transmitted using the text messaging service (TMS).

25. The non-transitory computer readable storage medium of claim 24, the software instructions, when executed, comprising functionality to:
include, as authored by the publisher, a portion of the plurality of navigating keywords and corresponding representations thereof in the first GTP message for selection by the user,
wherein the at least one selected from a group consisting of the navigating keyword and the representation of the navigating keyword is selected from the portion of the plurality of navigating keywords and the corresponding representations by the user.

26. The non-transitory computer readable storage medium of claim 24, the software instructions, when executed, comprising functionality to:
receive, from the device while displaying the text page, a third user message comprising a pre-designated keyword for accessing one of a home text page of the textsite, a previous text page sent to the device prior to the text page in a navigation trace, and a forward text page sent to the device subsequent to the text page in the navigation trace, and
send, to the device and in response to receiving the third user message, a third GTP message comprising the one of the home text page, the previous text page, and the forward text page.

27. The non-transitory computer readable storage medium of claim 23, the software instructions, when executed, comprising functionality to:
provide, to the user, another registered unique keyword maintained by the GTP, wherein the another registered unique keyword is registered with the GTP by another publisher for accessing another textsite comprising another plurality of text pages published by the another publisher and indexed based on another plurality of navigating keywords in another textsite map defined by the another publisher, wherein the publisher and the another publisher are separate from an operating entity of the GTP,
receive, from the device, a second user message identifying the another registered unique keyword; and
exchange text messages with the device for navigating the another textsite using the another plurality of navigating keywords.

28. The non-transitory computer readable storage medium of claim 27,
wherein the text page comprises, as authored by the publisher, the another registered unique keyword, and
wherein the second user message is sent from the device for redirecting from the textsite to the another textsite based on user selection.

29. The non-transitory computer readable storage medium of claim 27, wherein the another textsite is converted from another website, the software instructions, when executed, comprising functionality to:
map another navigating keyword to another link of the another website; and
convert another webpage of the another website indexed by the another link to another text page indexed by the another navigating keyword.

30. The non-transitory computer readable storage medium of claim 27, wherein at least one selected from the textsite and the another textsite is hosted on a server of the GTP.

31. The non-transitory computer readable storage medium of claim 27, wherein at least one selected from the textsite and the another textsite is hosted on a third party server separate from the GTP.

32. The non-transitory computer readable storage medium of claim 23, the software instructions, when executed, comprising functionality to:
distribute an advertisement associated with the GTP and the publisher, the advertisement comprising the registered unique keyword.

33. The non-transitory computer readable storage medium of claim 23, the software instructions, when executed, comprising functionality to:
receive a request for the GTP from the device;
send, to the device and in response to receiving the request, a second GTP message identifying a plurality of registered unique keywords from which the user selects the registered unique keyword,
wherein the plurality of registered unique keywords are registered with the GTP by a plurality of publishers.

34. The non-transitory computer readable storage medium of claim 33, wherein receiving the request comprises:
receiving, from the device, a second user message comprising pre-designated keyword for requesting the plurality of registered unique keywords.

35. The non-transitory computer readable storage medium of claim 33, wherein receiving the request comprises:
receiving a conversationless phone call from the device using a phone number of the GTP.

* * * * *